US012334091B2

(12) United States Patent
Gao

(10) Patent No.: US 12,334,091 B2
(45) Date of Patent: Jun. 17, 2025

(54) HIGH RESOLUTION AUDIO CODING

(71) Applicant: HUAWEI TECHNOLOGIES CO., LTD., Guangdong (CN)

(72) Inventor: Yang Gao, Ladera Ranch, CA (US)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 177 days.

(21) Appl. No.: 17/373,364

(22) Filed: Jul. 12, 2021

(65) Prior Publication Data

US 2021/0343302 A1 Nov. 4, 2021

Related U.S. Application Data

(63) Continuation of application No. PCT/US2020/013295, filed on Jan. 13, 2020.

(Continued)

(51) Int. Cl.
*G10L 19/06* (2013.01)
*G10L 19/02* (2013.01)
(Continued)

(52) U.S. Cl.
CPC .......... *G10L 19/06* (2013.01); *G10L 19/0204* (2013.01); *G10L 19/08* (2013.01); *G10L 19/09* (2013.01)

(58) Field of Classification Search
CPC ..... G10L 19/06; G10L 19/0204; G10L 19/08; G10L 19/09
See application file for complete search history.

(56) References Cited

U.S. PATENT DOCUMENTS 6,931,373 B1 8/2005 Bhaskar et al.
8,326,641 B2 * 12/2012 Song .................. G10L 19/0204 704/502

(Continued)

FOREIGN PATENT DOCUMENTS

JP 2005202262 A 7/2005
JP 2007513364 A 5/2007

(Continued)

OTHER PUBLICATIONS

Florencio, Dinei A. F., "Investigating the Use of Asymmetric Windows in CELP Vocoders", Apr. 1993, 1993 IEEE International Conference on Acoustics, Speech, and Signal Processing, vol. 2, pp. 427-430. (Year: 1993).*

(Continued)

*Primary Examiner* — Daniel C Washburn
*Assistant Examiner* — James Boggs
(74) *Attorney, Agent, or Firm* — WOMBLE BOND DICKINSON (US) LLP

(57) ABSTRACT

Methods, systems, and apparatus, including computer programs encoded on computer storage media, for performing audio coding are described. One example of the methods includes receiving an audio signal that includes one or more subband signals. A residual signal of at least one of the one or more subband signals is generated based on the at least one of the one or more subband signals. It is determined that the at least one of the one or more subband signals is a high pitch signal. In response to determining that the at least one of the one or more subband signals is a high pitch signal, weighting is performed on the residual signal of the at least one of the one or more subband signal to generate a weighted residual signal.

16 Claims, 21 Drawing Sheets

Related U.S. Application Data

(60) Provisional application No. 62/791,820, filed on Jan. 13, 2019.

(51) Int. Cl.
*G10L 19/08* (2013.01)
*G10L 19/09* (2013.01)

(56) References Cited

U.S. PATENT DOCUMENTS

| | | | | |
|---|---|---|---|---|
| 8,352,250 | B2 * | 1/2013 | Vos | G10L 21/02 704/226 |
| 8,433,563 | B2 * | 4/2013 | Vos | G10L 19/12 704/223 |
| 8,452,587 | B2 * | 5/2013 | Liu | G10L 19/008 704/203 |
| 9,082,398 | B2 * | 7/2015 | Gao | G10L 19/26 |
| 9,589,570 | B2 * | 3/2017 | Gao | G10L 19/24 |
| 9,805,736 | B2 * | 10/2017 | Liu | G10L 21/038 |
| 9,837,092 | B2 * | 12/2017 | Gao | G10L 19/125 |
| 10,109,284 | B2 * | 10/2018 | Atti | G10L 21/0388 |
| 2004/0181411 | A1 * | 9/2004 | Gao | G10L 19/265 704/262 |
| 2009/0083041 | A1 | 3/2009 | Yoshida | |
| 2010/0174535 | A1 | 7/2010 | Vos et al. | |
| 2011/0040566 | A1 | 2/2011 | Moon et al. | |
| 2011/0046946 | A1 | 2/2011 | Liu et al. | |
| 2011/0313761 | A1 | 12/2011 | Zhang et al. | |
| 2015/0235653 | A1 | 8/2015 | Liu et al. | |
| 2017/0323652 | A1 * | 11/2017 | Gao | G10L 21/003 |

FOREIGN PATENT DOCUMENTS

| | | | |
|---|---|---|---|
| JP | 2009527017 | A | 7/2009 |
| RU | 2477532 | C2 | 3/2013 |
| WO | 2011086924 | A1 | 7/2011 |

OTHER PUBLICATIONS

McCree, A.V., “Low-Bit-Rate Speech Coding”, 2008, In: Benesty, J., Sondhi, M.M., Huang, Y.A. (eds) Springer Handbook of Speech Processing, Springer Handbooks, Springer, Berlin, Heidelberg. (Year: 2008).*

Ulrich Kornagel. Techniques for artificial bandwidth extension of telephonespeech. Signal Processing, Jun. 1, 2006, vol. 86, No. 6, pp. 1296-1306.

Low-Complexity, full-band audio coding for high-quality, conversationalapplications. Recommendation ITU-T G.719. Jun. 2008, 58 Pages.

* cited by examiner

HIGH RESOLUTION AUDIO CODING

CROSS-REFERENCE TO RELATED APPLICATIONS

This application is a continuation of International Application No. PCT/US2020/013295, filed on Jan. 13, 2020, which claims priority to U.S. Provisional Patent Application No. 62/791,820, filed on Jan. 13, 2019. The disclosures of the aforementioned applications are hereby incorporated by reference in their entireties.

TECHNICAL FIELD

The present disclosure relates to signal processing, and more specifically to improving efficacy of audio signal coding.

BACKGROUND

High-resolution (hi-res) audio, also known as high-definition audio or HD audio, is a marketing term used by some recorded-music retailers and high-fidelity sound reproduction equipment vendors. In its simplest terms, hi-res audio tends to refer to music files that have a higher sampling frequency and/or bit depth than compact disc (CD)—which is specified at 16-bit/44.1 kHz. The main claimed benefit of hi-res audio files is superior sound quality over compressed audio formats. With more information on the file to play with, hi-res audio tends to boast greater detail and texture, bringing listeners closer to the original performance.

Hi-res audio comes with a downside though: file size. A hi-res file can typically be tens of megabytes in size, and a few tracks can quickly eat up the storage on a device. Although storage is much cheaper than it used to be, the size of the files can still make hi-res audio cumbersome to stream over Wi-Fi or mobile network without compression.

SUMMARY

In some implementations, the specification describes techniques for improving efficacy of audio signal coding.

In a first embodiment, a method for audio coding includes: receiving an audio signal, the audio signal comprising one or more subband signals; generating a residual signal of at least one of the one or more subband signals based on the at least one of the one or more subband signals; determining that the at least one of the one or more subband signals is a high pitch signal; and in response to determining that the at least one of the one or more subband signals is a high pitch signal, performing weighting on the residual signal of the at least one of the one or more subband signal to generate a weighted residual signal.

In a second embodiment, an electronic device includes: a non-transitory memory storage comprising instructions, and one or more hardware processors in communication with the memory storage, wherein the one or more hardware processors execute the instructions to: receive an audio signal, the audio signal comprising one or more subband signals; generate a residual signal of at least one of the one or more subband signals based on the at least one of the one or more subband signals; determine that the at least one of the one or more subband signals is a high pitch signal; and in response to determining that the at least one of the one or more subband signals is a high pitch signal, perform weighting on the residual signal of the at least one of the one or more subband signal to generate a weighted residual signal.

In a third embodiment, a non-transitory computer-readable medium storing computer instructions for audio coding, that when executed by one or more hardware processors, cause the one or more hardware processors to perform operations including: receiving an audio signal, the audio signal comprising one or more subband signals; generating a residual signal of at least one of the one or more subband signals based on the at least one of the one or more subband signals; determining that the at least one of the one or more subband signals is a high pitch signal; and in response to determining that the at least one of the one or more subband signals is a high pitch signal, performing weighting on the residual signal of the at least one of the one or more subband signal to generate a weighted residual signal.

The previously described embodiment are implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method and the instructions stored on the non-transitory, computer-readable medium.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
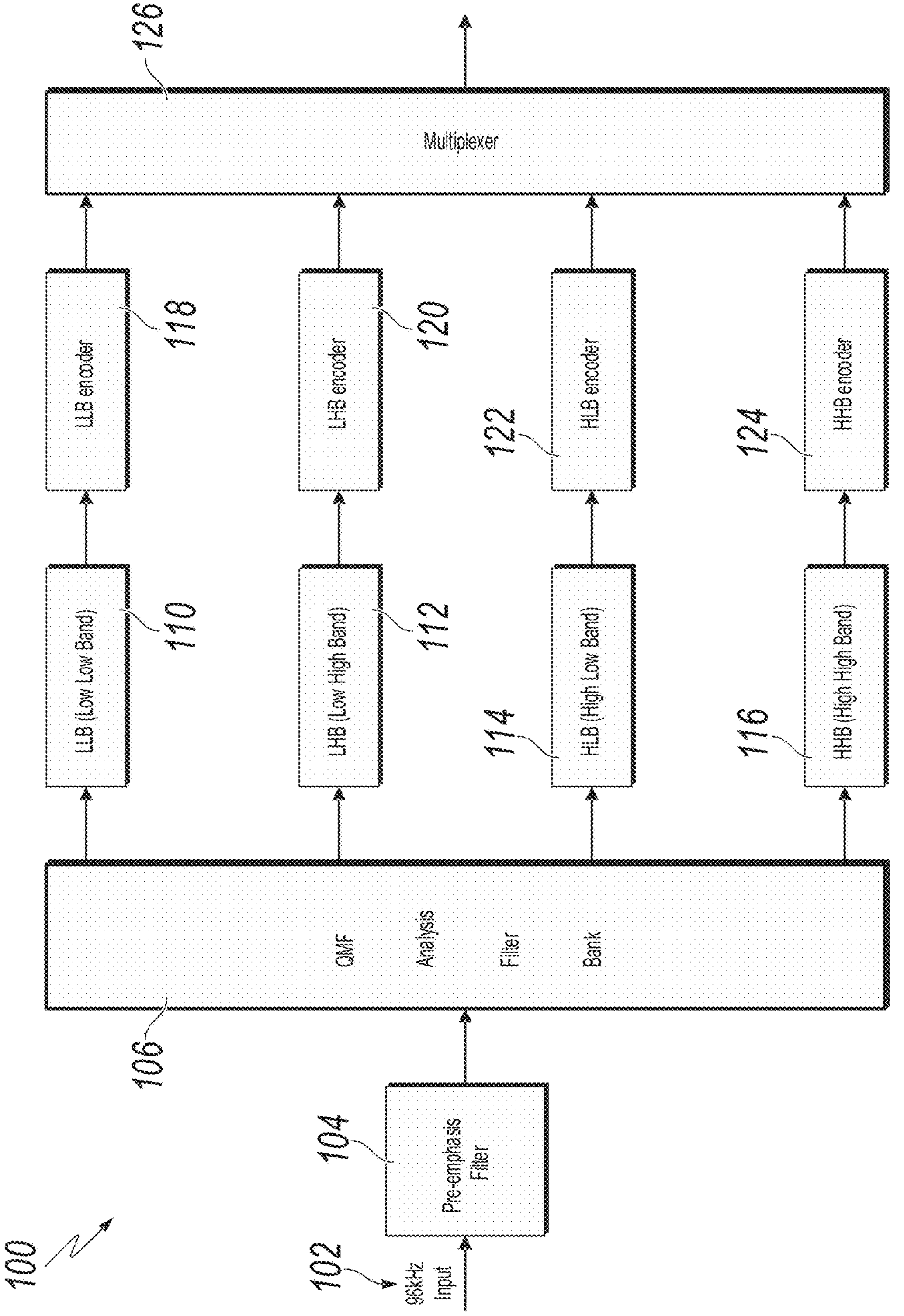
FIG. 1 shows an example structure of a L2HC (Low delay & Low complexity High resolution Codec) encoder according to some implementations.

It should be understood at the outset that although illustrative implementations of one or more embodiments are provided below, the disclosed systems and/or methods may be implemented using any number of techniques, whether currently known or in existence. The disclosure should in no way be limited to the illustrative embodiments, implementations, drawings, and techniques illustrated below, including the exemplary designs and embodiments illustrated and described herein, but may be modified and/or combined within the scope of the appended claims along with their full scope of equivalents.

High-resolution (hi-res) audio, also known as high-definition audio or HD audio, is a marketing term used by some recorded-music retailers and high-fidelity sound reproduction equipment vendors. Hi-res audio has slowly but surely hit the mainstream, thanks to the release of more products, streaming services, and even smartphones supporting the hi-res standards. However, unlike high-definition video, there's no single universal standard for hi-res audio. The Digital Entertainment Group, Consumer Electronics Association, and The Recording Academy, together with record labels, have formally defined hi-res audio as: "[l]ossless audio that is capable of reproducing the full range of sound from recordings that have been mastered from better than CD quality music sources." In its simplest terms, hi-res audio tends to refer to music files that have a higher sampling frequency and/or bit depth than compact disc (CD)—which is specified at 16-bit/44.1 kHz. Sampling frequency (or sample rate) refers to the number of times samples of the signal are taken per second during the analogue-to-digital conversion process. The more bits there are, the more accurately the signal can be measured in the first instance. Therefore, going from 16-bit to 24-bit in the bit depth can deliver a noticeable leap in quality. Hi-res audio files usually use a sampling frequency of 96 kHz (or even much higher) at 24-bit. In some cases, a sampling frequency of 88.2 kHz can also be used for hi-res audio files too. There also exist 44.1 kHz/24-bit recordings that are labeled HD audio.

There are several different hi-res audio file formats with their own compatibility requirements. File formats capable of storing high-resolution audio include the popular FLAC (Free Lossless Audio Codec) and ALAC (Apple Lossless Audio Codec) formats, both of which are compressed but in a way which means that, in theory, no information is lost. Other formats include the uncompressed WAV (Waveform Audio File) and AIFF (Audio Interchange File Format) formats, DSD (Direct Stream Digital, the format used for Super Audio CDs) and the more recent MQA (Master Quality Authenticated). Below is a breakdown of the main file formats:

WAV (hi-res): The standard format all CDs are encoded in. Great sound quality but it's uncompressed, meaning huge file sizes (especially for hi-res files). It has poor metadata support (that is, album artwork, artist and song title information).

AIFF (hi-res): Apple's alternative to WAV, with better metadata support. It is lossless and uncompressed (so big file sizes), but not massively popular.

FLAC (hi-res): This lossless compression format supports hi-res sample rates, takes up about half the space of WAV, and stores metadata. It's royalty-free and widely supported (though not by Apple) and is considered the preferred format for downloading and storing hi-res albums.

ALAC (hi-res): Apple's own lossless compression format also does hi-res, stores metadata and takes up half the space of WAV. An iTunes- and iOS-friendly alternative to FLAC.

DSD (hi-res): The single-bit format used for Super Audio CDs. It comes in 2.8 MHz, 5.6 MHz and 11.2 MHz varieties, but is not widely supported.

MQA (hi-res): A lossless compression format that packages hi-res files with more emphasis on the time domain. It is used for Tidal Masters hi-res streaming, but has limited support across products.

MP3 (not hi-res): MPEG Audio Layer III, a popular, lossy compressed format ensures small file size, but far from the best sound quality. Convenient for storing music on smartphones and iPods, but does not support hi-res.

AAC (not hi-res): Advanced Audio Coding, an alternative to MP3s, lossy and compressed but sounds better. Used for iTunes downloads, Apple Music streaming (at 256 kbps), and YouTube streaming.

The main claimed benefit of hi-res audio files is superior sound quality over compressed audio formats. Downloads from sites such as Amazon and iTunes, and streaming services such as Spotify, use compressed file formats with relatively low bitrates, such as 256 kbps AAC files on Apple Music and 320 kbps Ogg Vorbis streams on Spotify. The use of lossy compression means data is lost in the encoding process, which in turn means resolution is sacrificed for the sake of convenience and smaller file sizes. This has an effect upon the sound quality. For example, the highest quality MP3 has a bit rate of 320 kbps, whereas a 24-bit/192 kHz file has a data rate of 9216 kbps. Music CDs are 1411 kbps. The hi-res 24-bit/96 kHz or 24-bit/192 kHz files should, therefore, more closely replicate the sound quality the musicians and engineers were working with in the studio. With more information on the file to play with, hi-res audio tends to boast greater detail and texture, bringing listeners closer to the original performance—provided the playing system is transparent enough.

Hi-res audio comes with a downside though: file size. A hi-res file can typically be tens of megabytes in size, and a few tracks can quickly eat up the storage on device. Although storage is much cheaper than it used to be, the size of the files can still make hi-res audio cumbersome to stream over wireless fidelity (Wi-Fi) or mobile network without compression.

There are a huge variety of products that can play and support hi-res audio. It all depends on how big or small the system is, how much the budget is, and what method is mostly used to listen to the tunes. Some examples of the products supporting hi-res audio are described below.

Smartphones

Smartphones are increasingly supporting hi-res playback. This is restricted to flagship Android models, though, such as the current Samsung Galaxy S9 and S9+ and Note 9 (they all support DSD files), and Sony's Xperia XZ3. LG's V30 and V30S ThinQ's hi-res supporting phones are currently the ones to offer MQA compatibility, while Samsung's S9 phones even support Dolby Atmos. Apple iPhones so far do not support hi-res audio out of the box, though there are ways around this by using the right app, and then either plugging in a digital-to-analog converter (DAC) or using Lightning headphones with the iPhones' Lightning connector.

Tablets

High-res-playing tablets also exist and include the likes of the Samsung Galaxy Tab S4. At MWC 2018, a number of new compatible models were launched, including the M5 range from Huawei and Onkyo's intriguing Granbeat tablet.

Portable Music Players

Alternatively, there are dedicated portable hi-res music players such as various Sony Walkmans and Astell & Kern's Award-winning portable players. These music players offer more storage space and far better sound quality than a multi-tasking smartphone. And while it's far from conventionally portable, the stunning expensive Sony DMP-Z 1 digital music player is packed with hi-res and direct stream digital (DSD) talents.

Desktop

For a desktop solution, the laptop (Windows, Mac, Linux, etc.) is a prime source for storing and playing hi-res music (after all, this is where the tunes from hi-res download sites are downloaded).

DACs

A USB (Universal Serial Bus) or desktop DAC (a digital-to-analogue converter, such as the Cyrus soundKey or Chord Mojo) is a good way to get great sound quality out of hi-res files stored on the computer or smartphone (whose audio circuits do not tend to be optimized for sound quality). Simply plug a decent DAC in between the source and headphones for an instant sonic boost.

Uncompressed audio files encode the full audio input signal into a digital format capable of storing the full load of the incoming data. They offer the highest quality and archival capability that comes at the cost of large file sizes, prohibiting their widespread use in many cases. Lossless encoding stands as the middle ground between uncompressed and lossy. It grants similar or same audio quality to uncompressed audio files at reduced sizes. Lossless codecs achieve this by compressing the incoming audio in a non-destructive way on encode before restoring the uncompressed information on decode. The file sizes of Lossless encoded audio are still too large for many applications. Lossy files are encoded differently than uncompressed or Lossless. The essential function of analog-to-digital conversion remains the same in lossy encoding techniques. Lossy diverges from uncompressed. Lossy codecs throw away a considerable amount of the information contained in the original sound waves while trying to keep the subjective audio quality as close as possible to the original sound waves. Because of this, lossy audio files are vastly smaller than uncompressed ones, allowing for use in live audio scenarios. If there is no subjective quality difference between lossy audio files and uncompressed ones, the quality of the lossy audio files can be considered as "transparent". Recently, several high resolution lossy audio codecs have been developed, among which LDAC (Sony) and AptX (Qualcomm) are most popular ones. LHDC (Savitech) is also one of them.

Consumers and high-end audio companies have been talking more about Bluetooth audio lately than ever before. Be it wireless headsets, hands-free ear pieces, automotive, or the connected home, there's a growing number of use cases for good quality Bluetooth audio. A number of companies have covered with solutions that exceed the so-so performance of out-of-the-box Bluetooth solutions. Qualcomm's aptX already has a ton of Android phones covered, but multimedia-giant Sony has its own high-end solution called LDAC. This technology had previously only been available on Sony's Xperia range of handsets, but with the roll-out of Android 8.0 Oreo the Bluetooth codec will be available as part of the core AOSP code for other OEMS to implement, if they wish. At the most basic level, LDAC supports the transfer of 24-bit/96 kHz (Hi-Res) audio files over the air via Bluetooth. The closest competing codec is Qualcomm's aptX HD, which supports 24-bit/48 kHz audio data. LDAC comes with three different types of connection mode—quality priority, normal, and connection priority. Each of these offers a different bit rate, weighing in at 990 kbps, 660 kbps, and 330 kbps respectively. Therefore, depending on the type of connection available, there are varying levels of quality. It's clear that the LDAC's lowest bit rates are not going to give the full 24-bit/96 kHz quality that LDAC boasts though. LDAC is an audio coding technology developed by Sony, which allows streaming audio over Bluetooth connections up to 990 kbit/s at 24-bit/96 kHz. It is used by various Sony products, including headphones, smartphones, portable media players, active speakers and home theaters. LDAC is a lossy codec, which employs a coding scheme based on the MDCT to provide more efficient data compression. LDAC's main competitor is Qualcomm's aptX-HD technology. High quality standard low-complexity sub-band codec (SBC) clocks in at a maximum of 328 kbps, Qualcomm's aptX at 352 kbps, and aptX HD is 576 kbps. On paper then, 990 kbps LDAC transmits a lot more data than any other Bluetooth codec out there. And even the low end connection priority setting competes with SBC and aptX, which will cater for those who stream music from the most popular services. There are two major parts to Sony's LDAC. First part is achieving a high enough Bluetooth transfer speed to reach 990 kbps, and the second part is squeezing high resolution audio data into this bandwidth with a minimal loss in quality. LDAC makes use of Bluetooth's optional Enhanced Data Rate (EDR) technology to boost data speeds outside of the usual A2DP (Advanced Audio Distribution Profile) profile limits. But this is hardware dependent. EDR speeds are not usually used by A2DP audio profiles.

The original aptX algorithm was based on time domain adaptive differential pulse-code modulation (ADPCM) principles without psychoacoustic auditory masking techniques. Qualcomm's aptX audio coding was first introduced to the commercial market as a semiconductor product, a custom programmed DSP integrated circuit with part name APTX100ED, which was initially adopted by broadcast automation equipment manufacturers who required a means to store CD-quality audio on a computer hard disk drive for automatic playout during a radio show, for example, hence replacing the task of the disc jockey. Since its commercial introduction in the early 1990s, the range of aptX algorithms for real-time audio data compression has continued to expand with intellectual property becoming available in the form of software, firmware, and programmable hardware for professional audio, television and radio broadcast, and consumer electronics, especially applications in wireless audio, low latency wireless audio for gaming and video, and audio over IP. In addition, the aptX codec can be used instead of SBC (sub-band coding), the sub-band coding scheme for lossy stereo/mono audio streaming mandated by the Bluetooth SIG for the A2DP of Bluetooth, the short-range wireless personal-area network standard. AptX is supported in high-performance Bluetooth peripherals. Today, both standard aptX and Enhanced aptX (E-aptX) are used in both ISDN and IP audio codec hardware from numerous broadcast equipment makers. An addition to the aptX family in the form of aptX Live, offering up to 8:1 compression, was introduced in 2007. And aptX-HD, a lossy, but scalable, adaptive audio codec was announced in April, 2009. AptX was previously named apt-X until acquired by CSR plc in 2010. CSR was subsequently acquired by Qualcomm in August 2015. The aptX audio codec is used for consumer and automotive wireless audio applications, notably the real-time streaming of lossy stereo audio over the Bluetooth A2DP connection/pairing between a "source" device (such as a smartphone, tablet or laptop) and a "sink" accessory (e.g. a Bluetooth stereo speaker, headset or headphones). The technology must be incorporated in both transmitter and receiver to derive the sonic benefits of aptX audio coding over the default sub-band coding (SBC) mandated by the Bluetooth standard. Enhanced aptX provides coding at 4:1 compression ratios for professional audio broadcast applications and is suitable for AM, FM, DAB, HD Radio.

Enhanced aptX supports bit-depths of 16, 20, or 24 bit. For audio sampled at 48 kHz, the bit-rate for E-aptX is 384 kbit/s (dual channel). AptX-HD has bit-rate of 576 kbit/s. It supports high-definition audio up to 48 kHz sampling rates and sample resolutions up to 24 bits. Unlike the name suggests the codec is still considered lossy. However, it permits a "hybrid" coding scheme for applications where average or peak compressed data rates must be capped at a constrained level. This involves the dynamic application of "near lossless" coding for those sections of audio where completely lossless coding is impossible due to bandwidth constraints. "Near lossless" coding maintains a high-definition audio quality, retaining audio frequencies up to 20 kHz and a dynamic range of at least 120 dB. Its main competitor is LDAC codec developed by Sony. Another scalable parameter within aptX-HD is coding latency. It can be dynamically traded against other parameters such as levels of compression and computational complexity.

LHDC stands for low latency and high-definition audio codec and is announced by Savitech. Comparing to the Bluetooth SBC audio format, LHDC can allow more than 3 times the data transmitted in order to provide the most realistic and high definition wireless audio and achieve no more audio quality disparity between wireless and wired audio devices. The increase of data transmitted enables users to experience more details and a better sound field, and immerse in the emotion of the music. However, more than 3 times SBC data rate can be too high for many practical applications.

Figure 2:
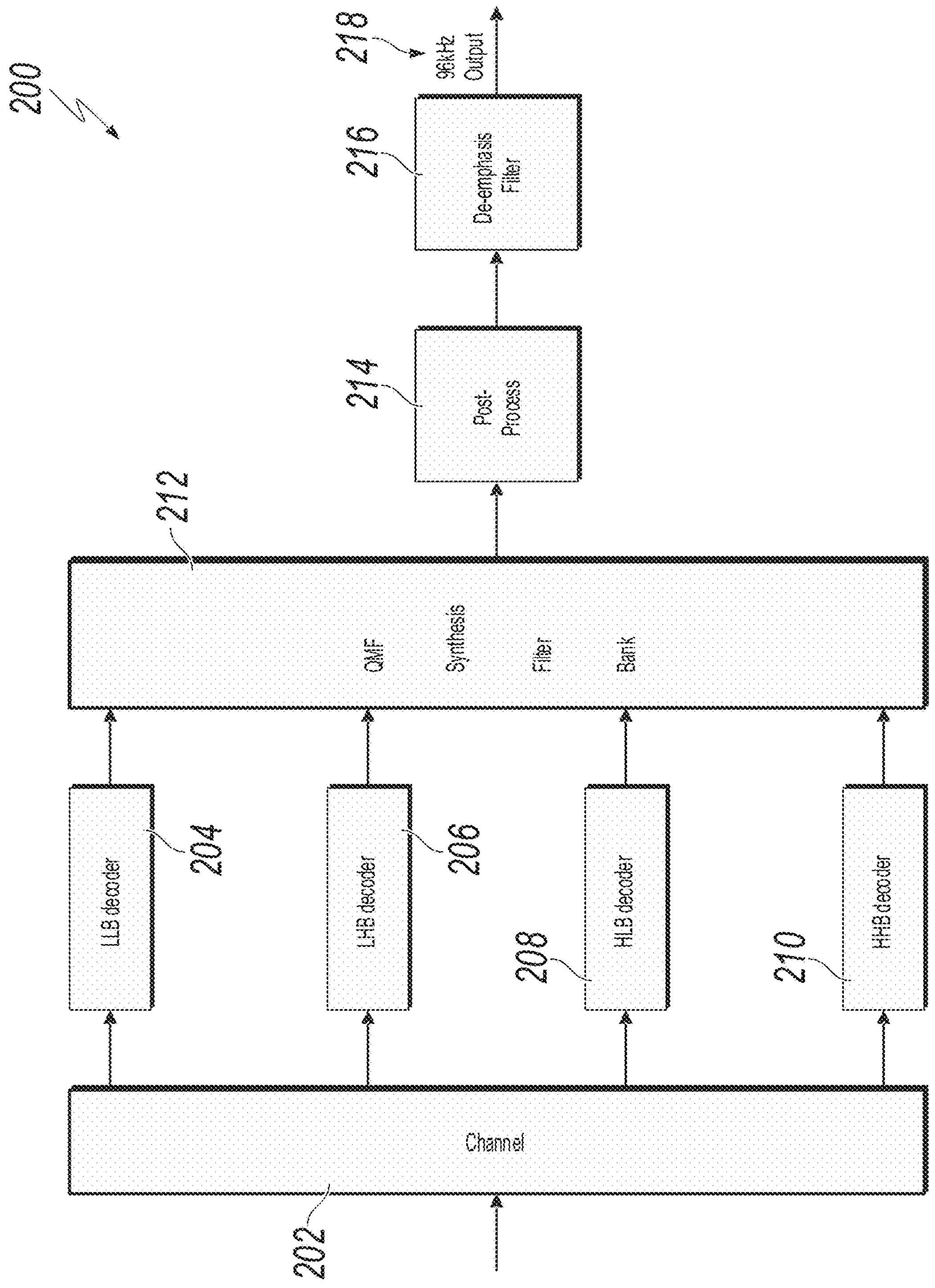
FIG. 2 shows an example structure of a L2HC decoder according to some implementations.

FIG. 1 shows an example structure of an L2HC (Low delay & Low complexity High resolution Codec) encoder 100 according to some implementations. FIG. 2 shows an example structure of an L2HC decoder 200 according to some implementations. Generally, L2HC can offer "transparent" quality at reasonably low bit rate. In some cases, the encoder 100 and decoder 200 may be implemented in a signal codec device. In some cases, the encoder 100 and decoder 200 may be implemented in different devices. In some cases, the encoder 100 and decoder 200 may be implemented in any suitable devices. In some cases, encoder 100 and decoder 200 may have the same algorithm delay (e.g., the same frame size or the same number of subframes). In some cases, the subframe size in samples can be fixed. For example, if the sampling rate is 96 kHz or 48 kHz, the subframe size can be 192 or 96 samples. Each frame can have 1, 2, 3, 4, or 5 subframes, which correspond to different algorithm delays. In some examples, when the input sampling rate of the encoder 100 is 96 kHz, the output sampling rate of the decoder 200 may be 96 kHz or 48 kHz. In some examples, when the input sampling rate of the sampling rate is 48 kHz, the output sampling rate of the decoder 200 may also be 96 kHz or 48 kHz. In some cases, the high band is artificially added if the input sampling rate of the encoder 100 is 48 kHz and the output sampling rate of the decoder 200 is 96 kHz.

In some examples, when the input sampling rate of the encoder 100 is 88.2 kHz, the output sampling rate of the decoder 200 may be 88.2 kHz or 44.1 kHz. In some examples, when the input sampling rate of the encoder 100 is 44.1 kHz, the output sampling rate of the decoder 200 may also be 88.2 kHz or 44.1 kHz. Similarly, the high band may also be artificially added when the input sampling rate of the encoder 100 is 44.1 kHz and the output sampling rate of the decoder 200 is 88.2 kHz. It is the same encoder to encode 96 kHz or 88.2 kHz input signal. It is also the same encoder to encode 48 kHz or 44.1 kHz input signal.

In some cases, at the L2HC encoder 100, the input signal bit depth may be 32b, 24b, or 16b. At the L2HC decoder 200, the output signal bit depth may also be 32b, 24b, or 16b. In some cases, the encoder bit depth at the encoder 100 and the decoder bit depth at the decoder 200 may be different.

In some cases, a coding mode (e.g., ABR_mode) can be set in the encoder 100, and can be modified in real-time during running. In some cases, ABR_mode=0 indicates high bit rate, ABR_mode=1 indicates middle bit rate, and ABR_mode=2 indicates low bit rate. In some cases, the ABR_mode information can be sent to the decoder 200 through bit-stream channel by spending 2 bits. The default number of channels can be stereo (two channels) as it is for Bluetooth ear phone applications. In some examples, the average bit rate for ABR_mode=2 may be from 370 to 400 kbps, the average bit rate for ABR_mode=1 may be from 450 to 550 kbps, and the average bit rate for ABR_mode=0 may be from 550 to 710 kbps. In some cases, the maximum instant bit rate for all cases/modes may be less than 990 kbps.

As shown in FIG. 1, the encoder 100 includes a pre-emphasis filter 104, a quadrature mirror filter (QMF) analysis filter bank 106, a low low band (LLB) encoder 118, a low high band (LHB) encoder 120, a high low band (HLB) encoder 122, a high high band (HHB) encoder 124, and a multiplexer 126. The original input digital signal 102 is first pre-emphasized by the pre-emphasis filter 104. In some cases, the pre-emphasis filter 104 may be a constant high-pass filter. The pre-emphasis filter 104 is helpful for most music signals as the most music signals contain much higher low frequency band energies than high frequency band energies. The increasing of the high frequency band energies can increase the processing precision of the high frequency band signals The output of the pre-emphasis filter 104 passes through the QMF analysis filter bank 106 to generate four subband signals-LLB signal 110, LHB signal 112, HLB signal 114, and HHB signal 116. In one example, the original input signal is generated at 96 kHz sampling rate. In this example, the LLB signal 110 includes 0-12 kHz subband, the LHB signal 112 includes 12-24 kHz subband, the HLB signal 114 includes 24-36 kHz subband, and the HHB signal 116 includes 36-48 kHz subband. As shown, each of the four subband signals is encoded respectively by the LLB encoder 118, LHB encoder 120, HLB encoder 122, and HHB encoder 124 to generate an encoded subband signal. The four encoded subband signals may be multiplexed by the multiplexer 126 to generate an encoded audio signal.

As shown in FIG. 2, the decoder 200 includes an LLB decoder 204, an LHB decoder 206, an HLB decoder 208, an HHB decoder 210, a QMF synthesis filter bank 212, a post-process component 214, and a de-emphasis filter 216. In some cases, each one of the LLB decoder 204, LHB decoder 206, HLB decoder 208, and HHB decoder 210 may receive an encoded subband signal from channel 202 respectively, and generate a decoded subband signal. The decoded subband signals from the four decoders 204-210 may be summed back through the QMF synthesis filter bank 212 to generate an output signal. The output signal may be post-processed by the post-process component 214 if needed, and then de-emphasized by the de-emphasis filter 216 to generate a decoded audio signal 218. In some cases, the de-emphasis filter 216 may be a constant filter and may be an inverse filter of the emphasis filter 104. In one example, the decoded audio signal 218 may be generated by the decoder 200 at the same sampling rate as the input audio signal (e.g., audio signal 102) of the encoder 100. In this example, the decoded audio signal 218 is generated at 96 kHz sampling rate.

Figure 3:
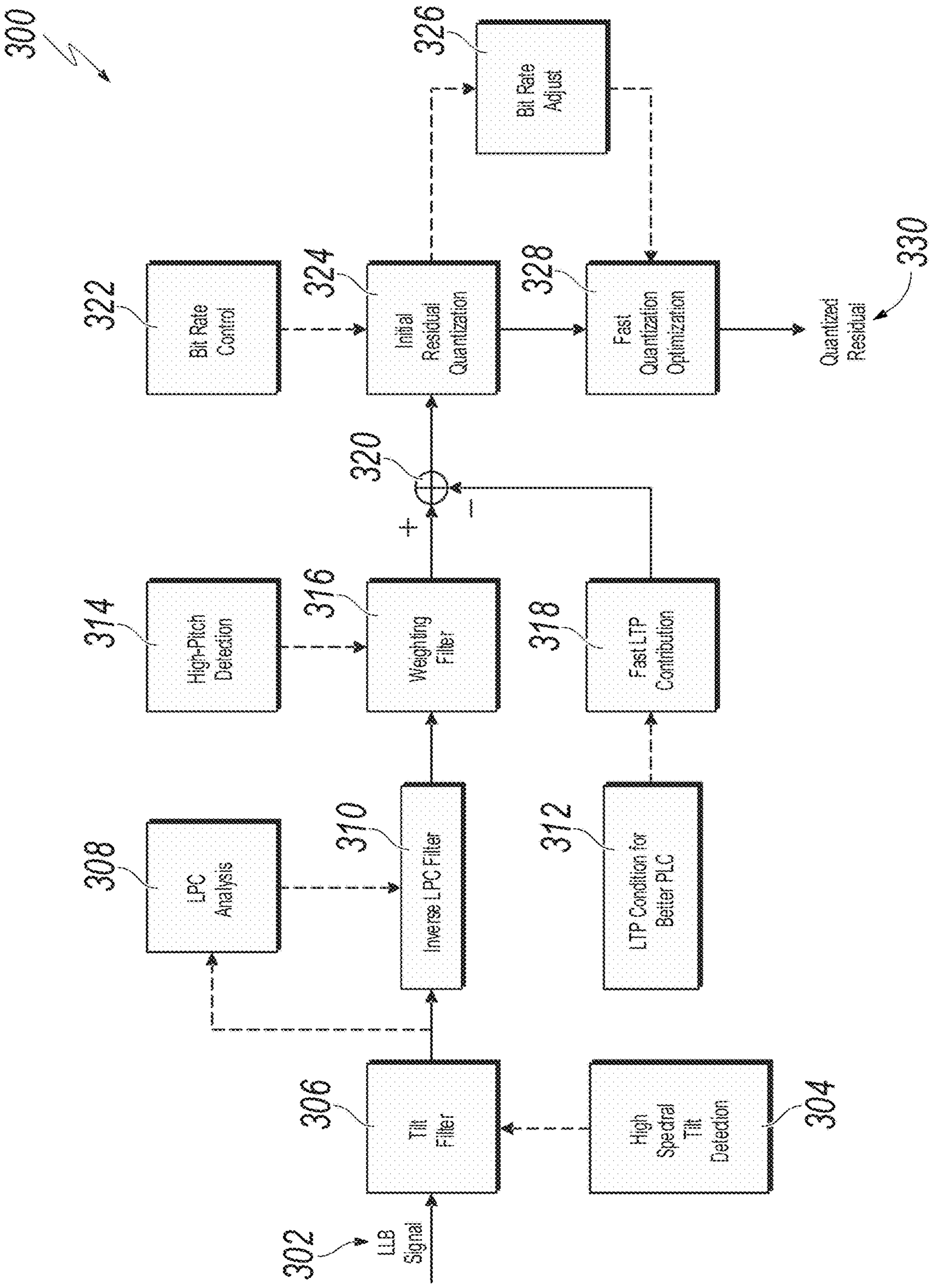
FIG. 3 shows an example structure of a low low band (LLB) encoder according to some implementations.
Figure 4:
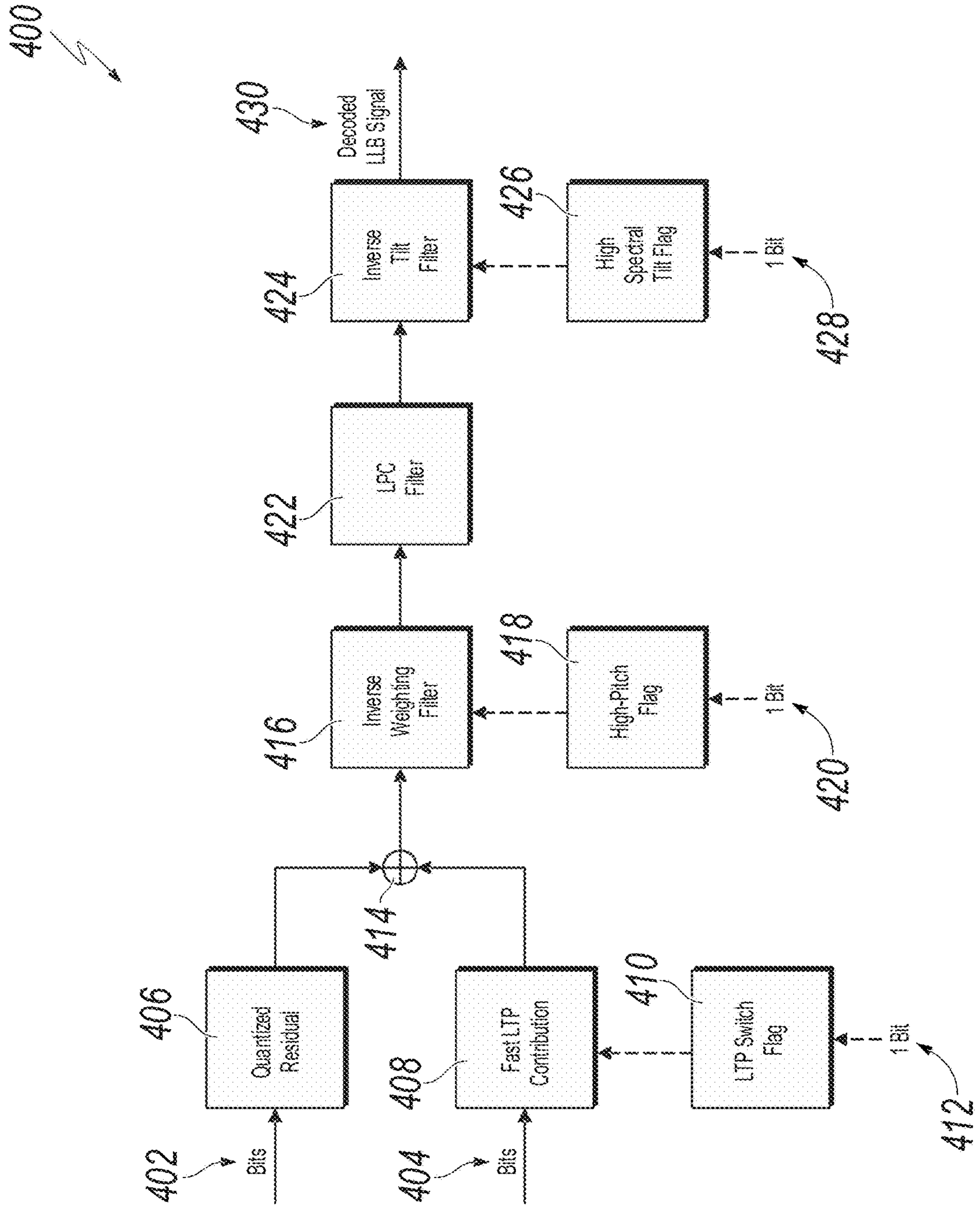
FIG. 4 shows an example structure of an LLB decoder according to some implementations.

FIG. 3 and FIG. 4 illustrate example structures of an LLB encoder 300 and an LLB decoder 400 respectively. As shown in FIG. 3, the LLB encoder 300 includes a high spectral tilt detection component 304, a tilt filter 306, a linear predictive coding (LPC) analysis component 308, an inverse LPC filter 310, a long-term prediction (LTP) condition component 312, a high-pitch detection component 314, a weighting filter 316, a fast LTP contribution component 318, an addition function unit 320, a bit rate control component 322, an initial residual quantization component 324, a bit rate adjusting component 326, and a fast quantization optimization component 328.

As shown in FIG. 3, the LLB subband signal 302 first passes through the tilt filter 306 which is controlled by the spectral tilt detection component 304. In some cases, a tilt-filtered LLB signal is generated by the tilt filter 306. The tilt-filtered LLB signal may then LPC-analyzed by the LPC analysis component 308 to generate LPC filter parameters in LLB subband. In some cases, the LPC filter parameters may be quantized and sent to the LLB decoder 400. The inverse LPC filter 310 can be used to filter the tilt-filtered LLB signal and generate an LLB residual signal. In this residual signal domain, the weighting filter 316 is added for high pitch signal. In some cases, the weighting filter 316 can be switched on or off depending on a high pitch detection by the high-pitch detection component 314, the detail of which will be explained in greater detail later. In some cases, a weighted LLB residual signal can be generated by the weighting filter 316.

As shown in FIG. 3, the weighted LLB residual signal becomes a reference signal. In some cases, when strong periodicity exists in the original signal, an LTP (Long-Term Prediction) contribution may be introduced by a fast LTP contribution component 318 based on a LTP condition 312. In the encoder 300, the LTP contribution may be subtracted from the weighted LLB residual signal by the addition function unit 320 to generate a second weighted LLB residual signal which becomes an input signal for the initial LLB residual quantization component 324. In some cases, an output signal of the initial LLB residual quantization component 324 may be processed by the fast quantization optimization component 328 to generate a quantized LLB residual signal 330. In some cases, the quantized LLB residual signal 330 together with the LTP parameters (when LTP exists) may be sent to the LLB decoder 400 through a bitstream channel.

FIG. 4 shows an example structure of the LLB decoder 400. As shown, the LLB decoder 400 includes bits 402 received by a quantized residual component 406, bits 404 received by a fast LTP contribution component 408, a bit 412 received by an LTP switch flag component 410, an addition function unit 414, an inverse weighting filter 416, a bit 420 received a high-pitch flag component 418, an LPC filter 422, an inverse tilt filter 424, and a bit 428 received by a high spectral tilt flag component 426. In some cases, a quantized residual signal from the quantized residual component 406 an LTP contribution signal from the fast LTP contribution component 408 may be added together by the addition function unit 414 to generate a weighted LLB residual signal as an input signal to the inverse weighting filter 416.

In some case, the inverse weighting filter 416 may be used to remove the weighting and recover the spectral flatness of the LLB quantized residual signal. In some cases, a recovered LLB residual signal may be generated by the inverse weighting filter 416. The recovered LLB residual signal may be again filtered by the LPC filter 422 to generate the LLB signal in the signal domain. In some cases, if a tilt filter (e.g., tilt filter 306) exists in the LLB encoder 300, the LLB signal in the LLB decoder 400 may be filtered by the inverse tilt filter 424 controlled by the high spectral tile flag component 426. In some cases, a decoded LLB signal 430 may be generated by the inverse tilt filter 424.

Figure 5:
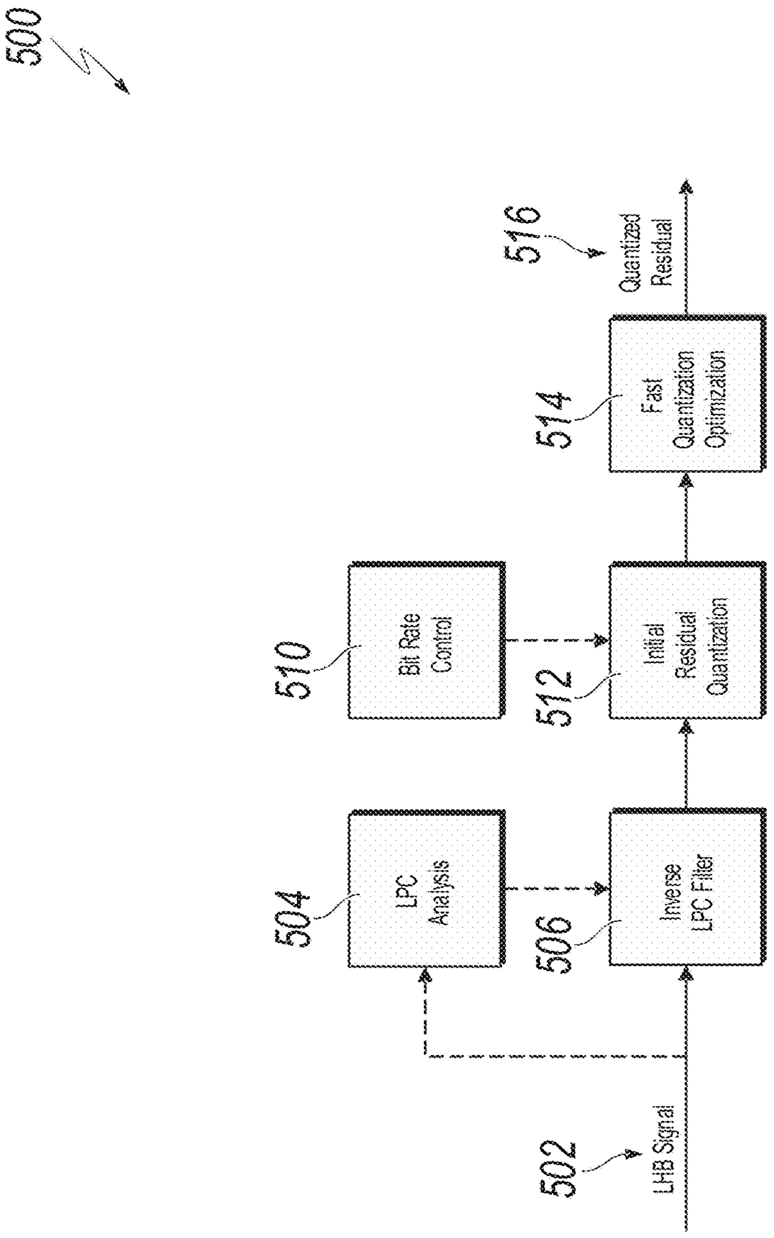
FIG. 5 shows an example structure of a low high band (LHB) encoder according to some implementations.
Figure 6:
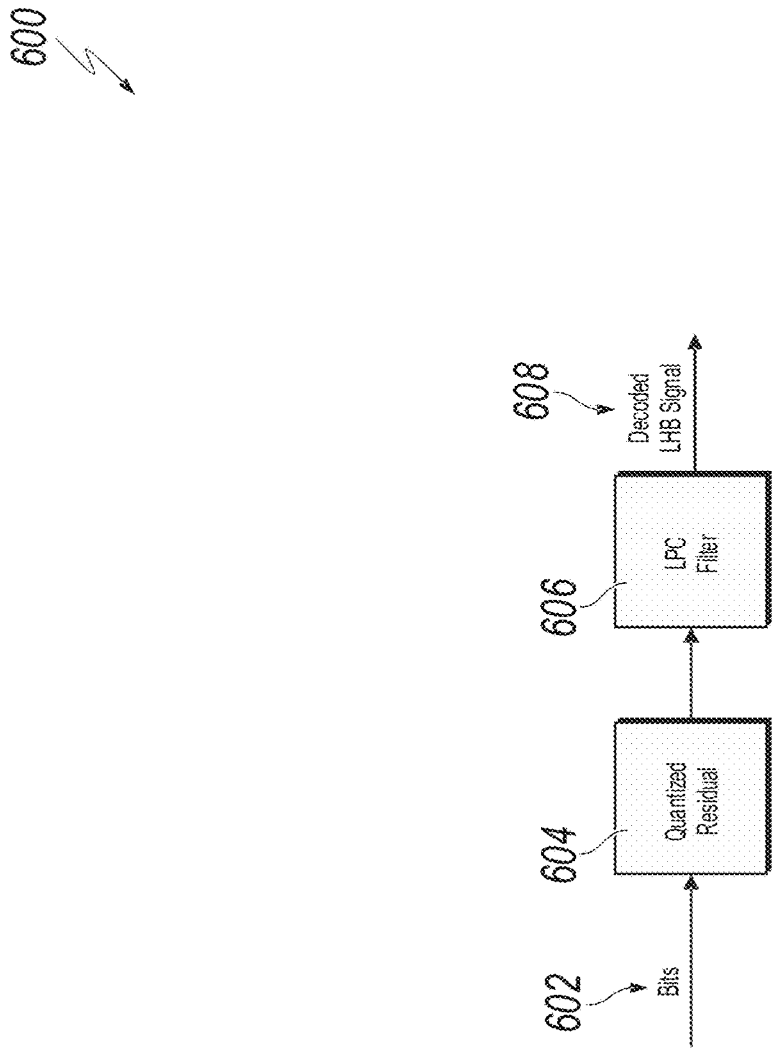
FIG. 6 shows an example structure of an LHB decoder according to some implementations.

FIG. 5 and FIG. 6 illustrate example structures of an LHB encoder 500 and an LHB 600 decoder. As shown in FIG. 5, the LHB encoder 500 includes an LPC analysis component 504, an inverse LPC filter 506, a bit rate control component 510, an initial residual quantization component 512, and a fast quantization optimization component 514. In some cases, an LHB subband signal 502 may be LPC-analyzed by the LPC analysis component 504 to generate LPC filter parameters in LHB subband. In some cases, the LPC filter parameters can be quantized and sent to the LHB decoder 600. The LHB subband signal 502 may be filtered by the inverse LPC filter 506 in the encoder 500. In some cases, an LHB residual signal may be generated by the inverse LPC filter 506. The LHB residual signal, which becomes an input signal for LHB residual quantization, can be processed by the initial residual quantization component 512 and the fast quantization optimization component 514 to generate a quantized LHB residual signal 516. In some cases, the quantized LHB residual signal 516 may be sent to the LHB decoder 600 subsequently. As shown in FIG. 6, the quantized residual 604 obtained from bits 602 may be processed by the LPC filter 606 for LHB subband to generate the decoded LHB signal 608.

Figure 7:
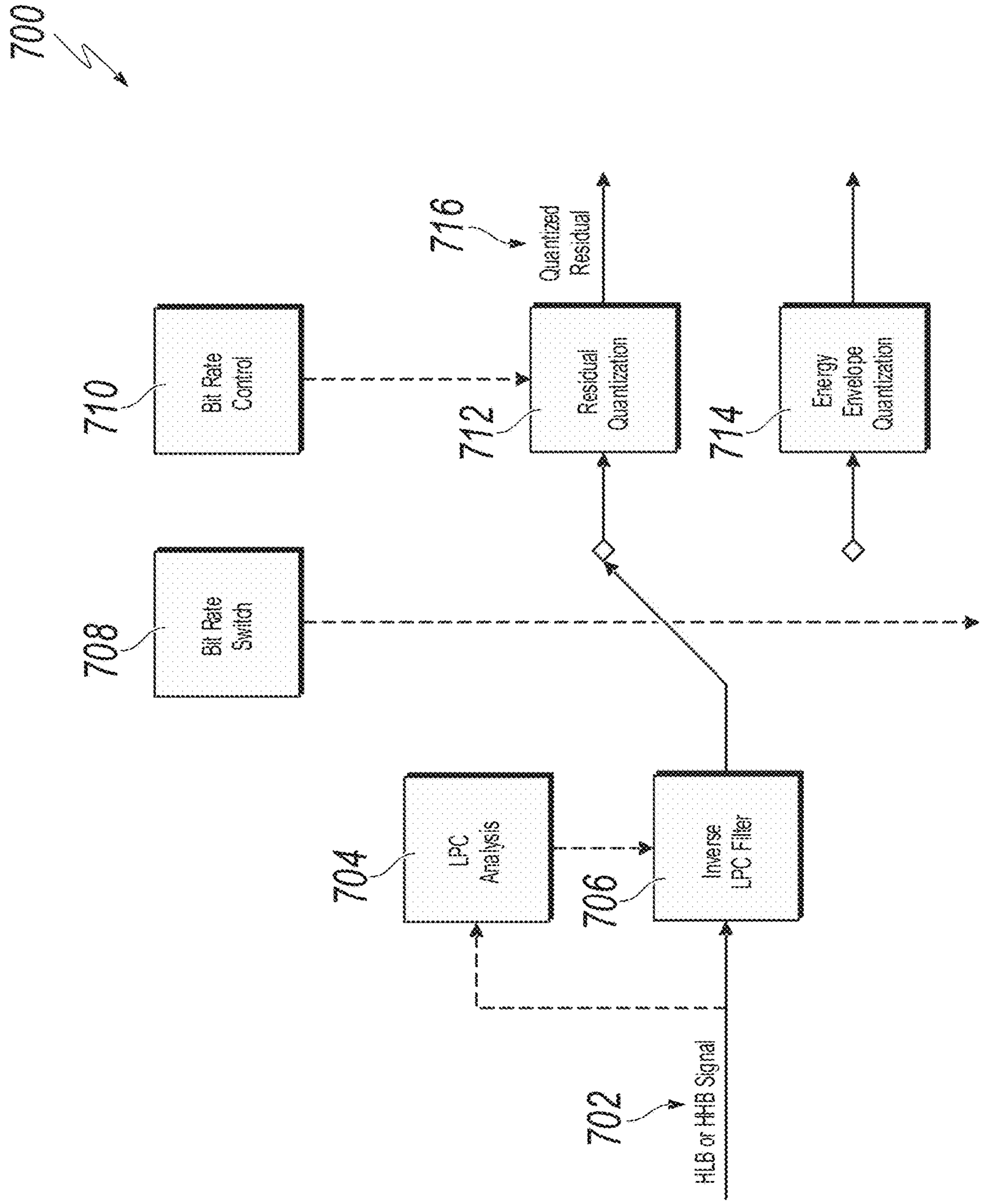
FIG. 7 shows an example structure of an encoder for high low band (HLB) and/or high high band (HHB) subband according to some implementations.
Figure 8:
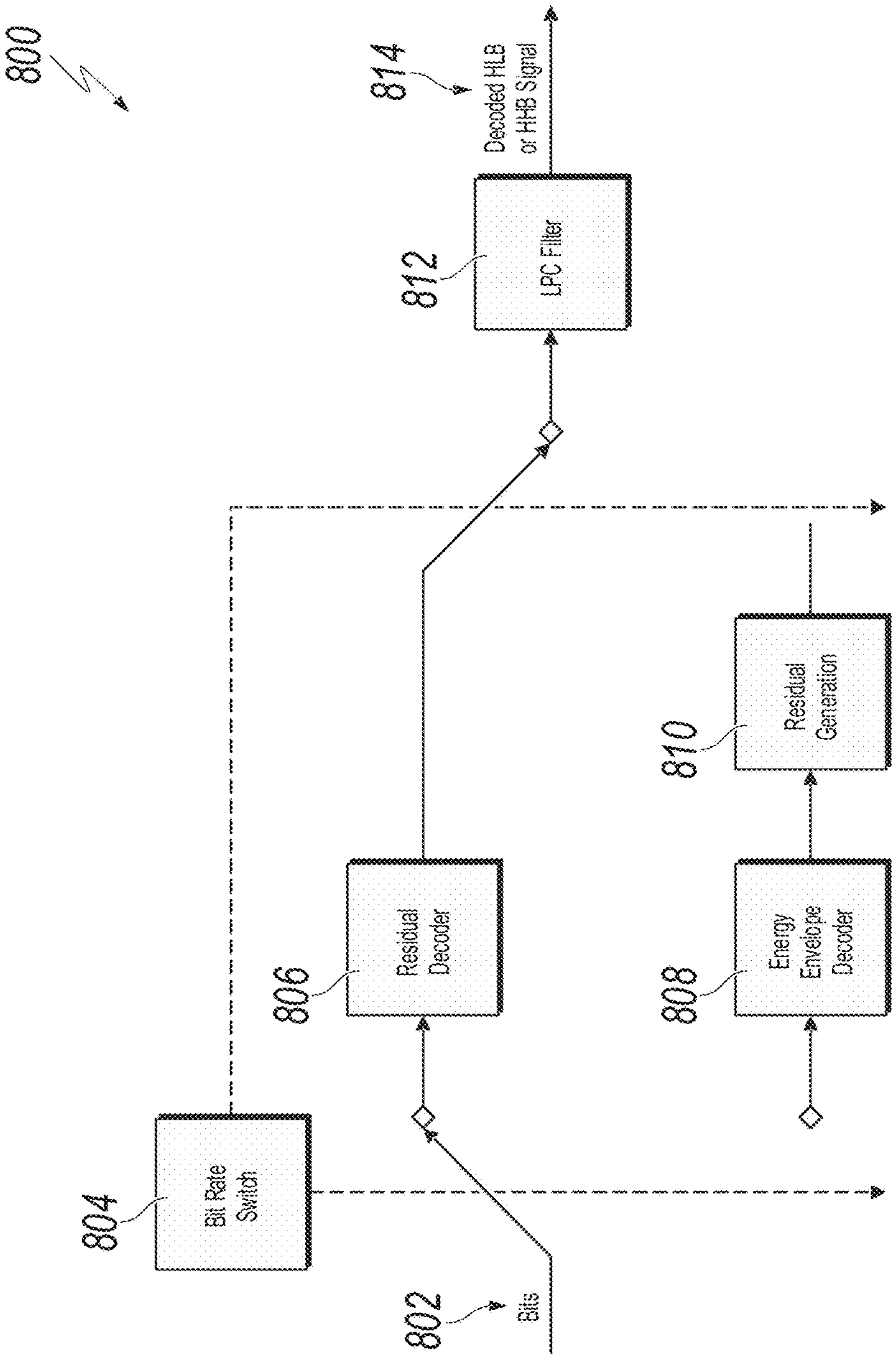
FIG. 8 shows an example structure of a decoder for HLB and/or HHB subband according to some implementations.

FIG. 7 and FIG. 8 illustrate example structures of an encoder 700 and a decoder 800 for HLB and/or HHB subbands. As shown, the encoder 700 includes an LPC analysis component 704, an inverse LPC filter 706, a bit rate switch component 708, a bit rate control component 710, a residual quantization component 712, and an energy envelope quantization component 714. As shown, the decoder 800 includes a bit rate switch component 804, a residual decoder 806, an LPC filter 812, an energy envelope decoder 808, and a residual generation component 810. Generally, both HLB and HHB are located at relatively high frequency area. In some cases, they are encoded and decoded in two possible ways. For example, if the bit rate is high enough (e.g., higher than 700 kbps for 96 KHz/24-bit stereo coding), they may be encoded and decoded like LHB. In one example, HLB or HHB subband signal 702 may be LPC-analyzed by the LPC analysis component 704 to generate LPC filter parameters in HLB or HHB subband. In some cases, the LPC filter parameters may be quantized and sent to the HLB or HHB decoder 800. The HLB or HHB subband signal 702 may be filtered by the inverse LPC filter 706 to generate an HLB or HHB residual signal. The HLB or HHB residual signal, which becomes a target signal for the residual quantization, may be processed by the residual quantization component 712 to generate a quantized HLB or HHB residual signal 716. The quantized HLB or HHB residual signal 716 may be subsequently sent to the decoder side (e.g., decoder 800) and bits 802 processed by the residual decoder 806 and LPC filter 812 to generate decoded HLB or HHB signal 814.

In some cases, if the bit rate is relatively low (e.g., lower than 500 kbps for 96 kHz/24-bit stereo coding), parameters of the LPC filter generated by the LPC analysis component 704 for HLB or HHB subbands may be still quantized and sent to the decoder side (e.g., decoder 800). However, the HLB or HHB residual signal may be generated without spending any bit, and only the time domain energy envelope of the residual signal is quantized and sent to the decoder with very low bit rate (e.g., less than 3 kbps to encode the energy envelope). In one example, the energy envelope quantization component 714 may receive the HLB or HHB residual signal from the inverse LPC filter and generate an output signal which may be subsequently sent to the decoder 800. Then, the output signal from the encoder 700 may be processed by the energy envelope decoder 808 and the residual generation component 810 to generate an input signal to the LPC filter 812. In some cases, the LPC filter 812 may receive an HLB or HHB residual signal from the residual generation component 810 and generate decoded HLB or HHB signal 814.

Figure 9:
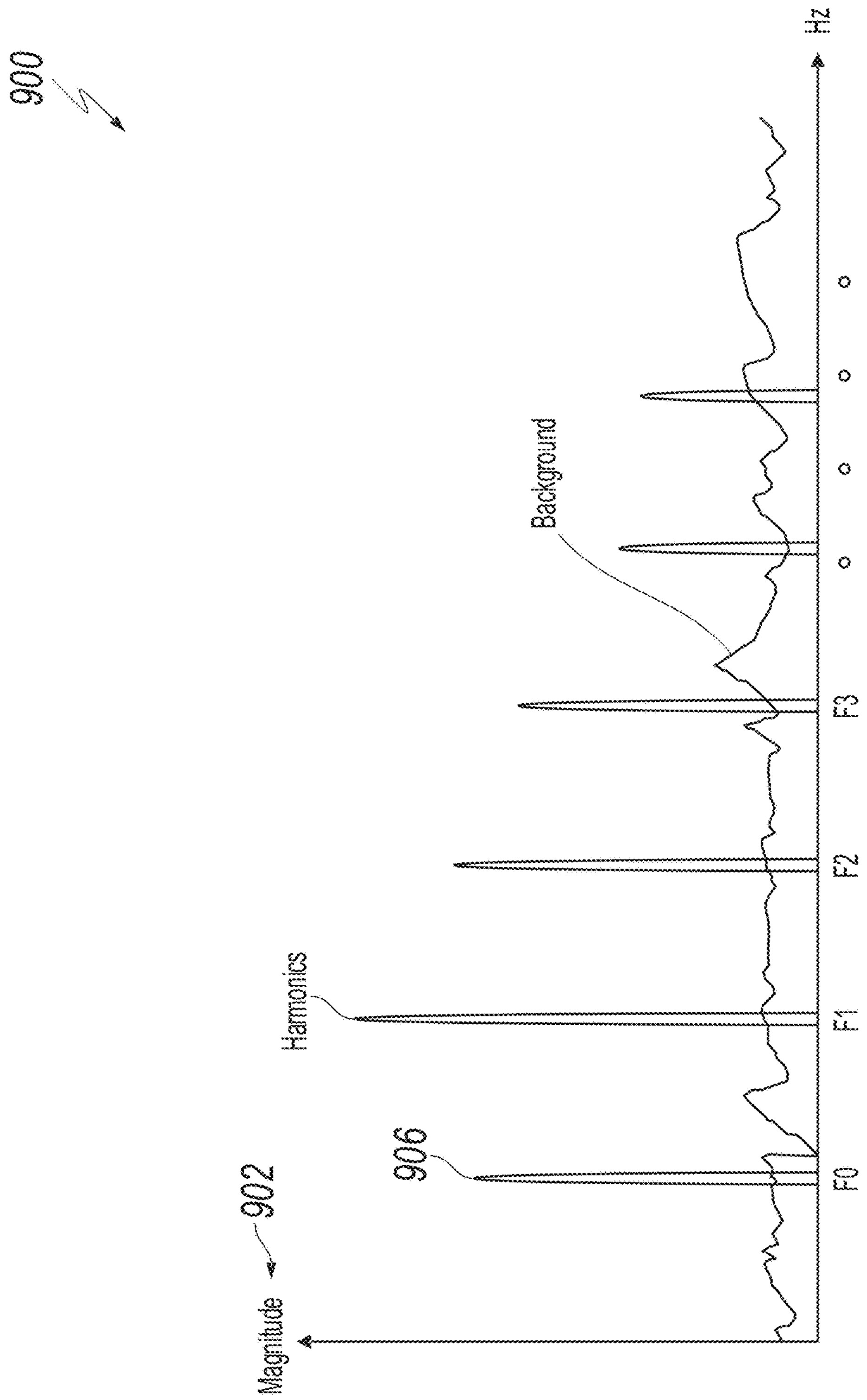
FIG. 9 shows an example spectral structure of a high pitch signal according to some implementations.

FIG. 9 shows an example spectral structure 900 of a high pitch signal, with magnitude 902 of harmonic frequencies illustrated on the y-axis and frequency illustrated on the x-axis. Generally, normal speech signal rarely has relatively high pitch spectral structure. However, music signals and singing voice signals often contains high pitch spectral structure. As shown, the spectral structure 900 includes a first harmonic frequency F0 which is relatively higher (e.g., F0>500 Hz) and a background spectrum level which is relatively lower. In this case, an audio signal having the spectral structure 900 may be considered as a high pitch signal. In the case of a high pitch signal, the coding error between 0 Hz and F0 may be easily heard due to lack of hearing masking effect. The error (e.g., an error between F1 and F2) may be masked by F1 and F2 as long as the peak energies of F1 and F2 are correct. However, if the bit rate is not high enough, the coding errors may not be avoided.

In some cases, finding a correct short pitch (high pitch) lag in the LTP can help improving the signal quality. However, it may not be enough for achieving a "transparent" quality. In order to improve the signal quality in a robust way, an adaptive weighting filter can be introduced, which enhances the very low frequencies and reduces the coding errors at very low frequencies at the cost of increasing the coding errors at higher frequencies. In some cases, the adaptive weighting filter (e.g., weighting filter 316) can be an one order pole filter as below:

$$W_E(Z) = \frac{1}{(1 - a * z^{-1})},$$

and the inverse weighting filter (e.g., inverse weighting filter 416) can be an one order zero filter as below:

$$W_D(Z) = 1 - a * z^{-1}.$$

In some cases, the adaptive weighting filter may be shown to improve the high pitch case. However, it may reduce the quality for other cases. Therefore, in some cases, the adaptive weighting filter can be switched on and off based on the detection of the high pitch case (e.g., using the high pitch detection component 314 of FIG. 3). There are many ways to detect high pitch signal. One way 1000 is described below with reference to FIG. 10.

Figure 10:
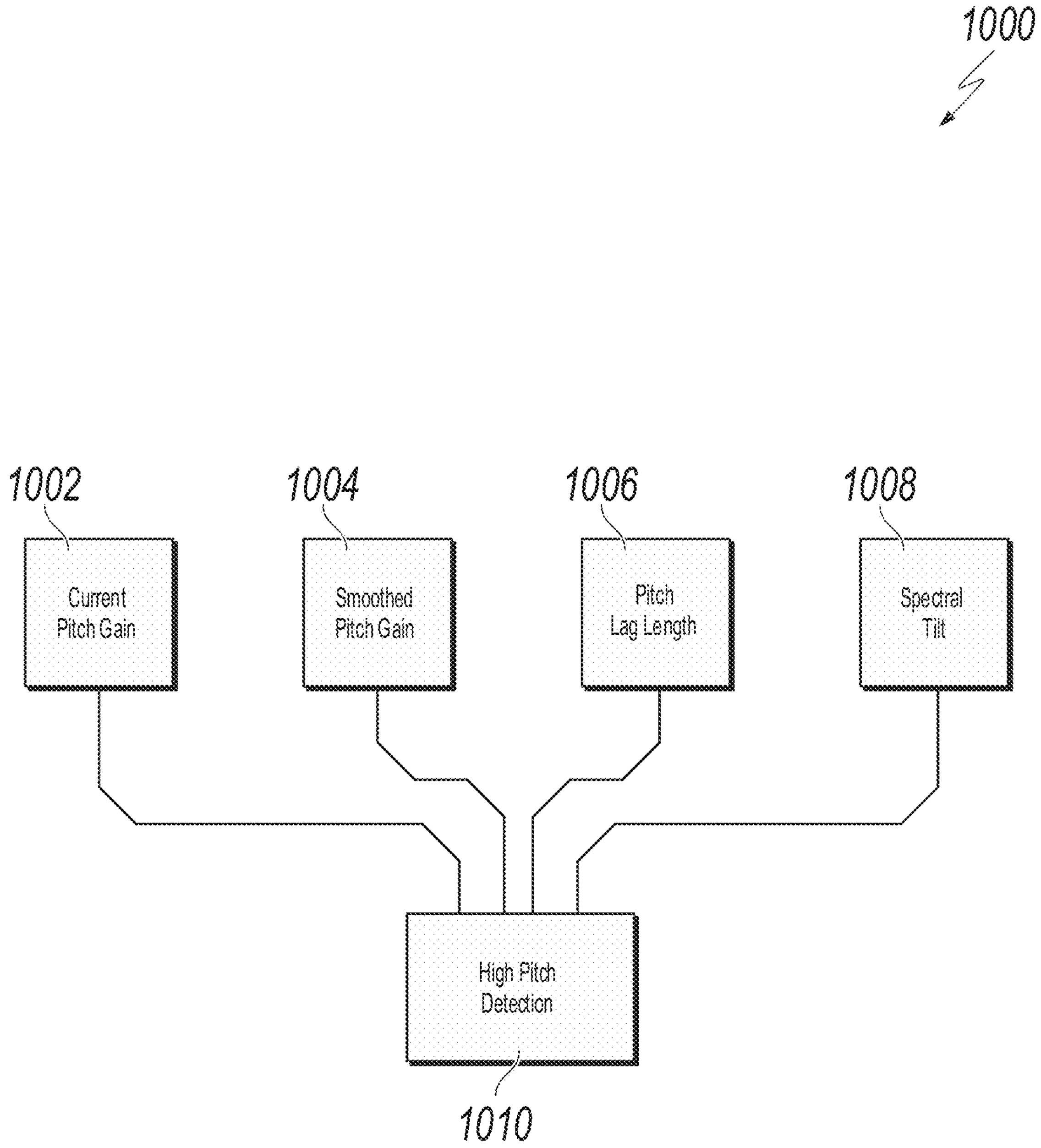
FIG. 10 shows an example process of high pitch detection according to some implementations.

As shown in FIG. 10, four parameters, including current pitch gain 1002, smoothed pitch gain 1004, pitch lag length 1006, and spectral tilt 1008, can be used by high pitch detection component 1010 to determine whether a high pitch signal exists or not. In some cases, the pitch gain 1002 indicates a periodicity of the signal. In some cases, the smoothed pitch gain 1004 represents a normalized value of the pitch gain 1002. In one example, if the normalized pitch gain (e.g., smoothed pitch gain 1004) is between 0 and 1, a high value of the normalized pitch gain (e.g., when the normalized pitch gain is close to 1) may indicate existence of strong harmonics in spectrum domain. The smoothed pitch gain 1004 may indicate that the periodicity is stable (not just local). In some cases, if the pitch lag length 1006 is short (e.g., less than 3 ms), it means the first harmonic frequency F0 is large (high). The spectral tilt 1008 may be measured by a segmental signal correlation at one sample distance or the first reflection coefficient of the LPC parameters. In some cases, the spectral tilt 1008 may be used to indicate if the very low frequency area contains significant energy or not. If the energy in the very low frequency area (e.g., frequencies lower than F0) is relatively high, the high pitch signal may not exist. In some cases, when the high pitch signal is detected, the weighting filter may be applied. Otherwise, the weighting filter may not be applied when the high pitch signal is not detected.

Figure 11:
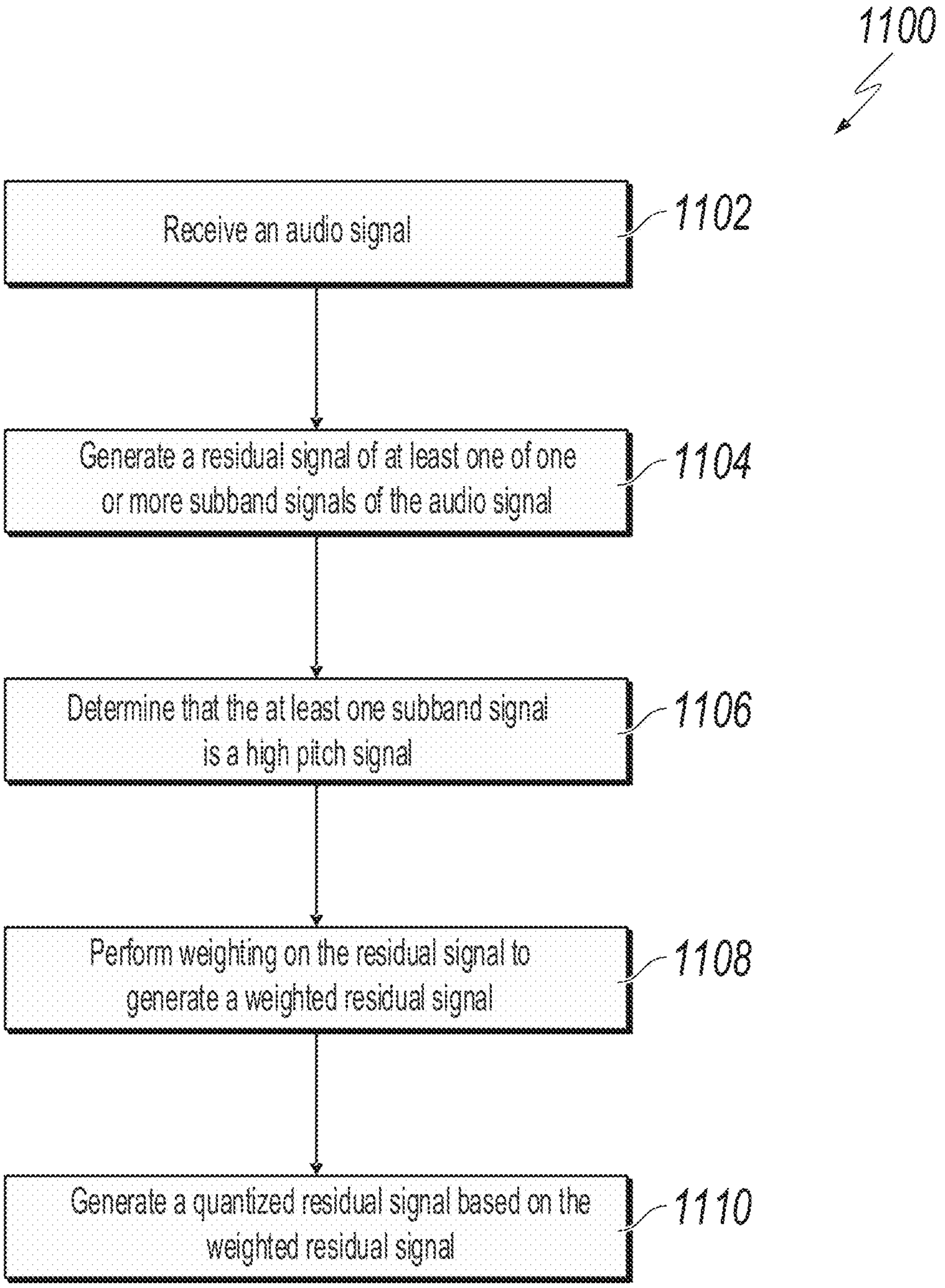
FIG. 11 is a flowchart illustrating an example method of performing perceptual weighting of a high pitch signal according to some implementations.

FIG. 11 is a flowchart illustrating an example method 1100 of performing perceptual weighting of a high pitch signal. In some cases, the method 1100 may be implemented by an audio codec device (e.g., LLB encoder 300). In some cases, the method 1100 can be implemented by any suitable device.

The method 1100 may begin at block 1102 wherein a signal (e.g., signal 102 of FIG. 1) is received. In some cases, the signal may be an audio signal. In some cases, the signal may include one or more subband components. In some cases, the signal may include an LLB component, an LHB component, an HLB component, and an HHB component. In one example, the signal may be generated at a sampling rate of 96 kHz and have a bandwidth of 48 kHz. In this example, the LLB component of the signal may include 0-12 kHz subband, the LHB component may include 12-24 kHz subband, the HLB component may include 24-36 kHz subband, and the HHB component may include 36-48 kHz subband. In some cases, the signal may be processed by a pre-emphasis filter (e.g., pre-emphasis filter 104) and a QMF analysis filter bank (e.g., QMF analysis filter bank 106) to generate the subband signals in the four subbands. In this example, an LLB subband signal, an LHB subband signal, an HLB subband signal, and an HHB subband signal may be generated respectively for the four subbands.

At block 1104, a residual signal of at least one of the one or more subband signals is generated based on the at least one of the one or more subband signals. In some cases, at least one of the one or more subband signals may be tilt-filtered to generate a tilt-filtered signal. In one example, the at least one of the one or more subband signal may include a subband signal in the LLB subband (e.g., the LLB subband signal 302 of FIG. 3). In some cases, the tilt-filtered signal may be further processed by an inverse LPC filter (e.g., inverse LPC filter 310) to generate a residual signal.

At block 1106, it is determined that the at least one of the one or more subband signal is a high pitch signal. In some cases, the at least one of the one or more subband signal is determined to be a high pitch signal based on least one of a current pitch gain, a smoothed pitch gain, a pitch lag length, or a spectral tilt of the at least one of the one or more subband signal.

In some cases, the pitch gain indicates a periodicity of the signal, and the smoothed pitch gain represents a normalized value of the pitch gain. In some examples, the normalized pitch gain may be between 0 and 1. In these examples, a high value of the normalized pitch gain (e.g., when the normalized pitch gain is close to 1) may indicate existence of strong harmonics in spectrum domain. In some cases, a short pitch lag length means that the first harmonic frequency (e.g., frequency F0 906 of FIG. 9) is large (high). If the first harmonic frequency F0 is relatively higher (e.g., F0>500 Hz) and a background spectrum level which is relatively lower (e.g., below of predetermined threshold), the high pitch signal may be detected. In some cases, the spectral tilt may be measured by a segmental signal correlation at one sample distance or the first reflection coefficient of the LPC parameters. In some cases, the spectral tilt may be used to indicate if the very low frequency area contains significant energy or not. If the energy in the very low frequency area (e.g., frequencies lower than F0) is relatively high, the high pitch signal may not exist.

At block 1108, a weighting operation is performed on the residual signal of the at least one of the one or more subband signals in response to determining that the at least one of the one or more subband signals is a high pitch signal. In some cases, when the high pitch signal is detected, a weighting filter (e.g., weighting filter 316) may be applied to the residual signal. In some cases, a weighted residual signal may be generated. In some cases, the weighting operation may not be performed when the high pitch signal is not detected.

As noted, in the case of high pitch signal, the coding error at low frequency area may be perceptually sensible due to lack of hearing masking effect. If the bit rate is not high enough, the coding errors may not be avoided. The adaptive weighting filter (e.g., weighting filter 316) and the weighting methods as described herein may be used to reduce the coding error and improve the signal quality in low frequency area. However, in some cases, this may increase the coding errors at higher frequencies, which may be insignificant for perceptual quality of high pitch signals. In some cases, the adaptive weighting filter may be conditionally turned on and off based on detection of high pitch signal. As described above, the weighting filter may be turned on when high pitch signal is detected and may be turned off when high pitch signal is not detected. In this way, the quality for high pitch cases may still be improved while the quality for non-high-pitch cases may not be compromised.

At block 1110, a quantized residual signal is generated based on the weighted residual signal as generated at block 1108. In some cases, the weighted residual signal, together with an LTP contribution, may be processed an addition function unit to generate a second weighted residual signal. In some cases, the second weighted residual signal may be quantized to generate a quantized residual signal, which may be further sent to the decoder side (e.g., LLB decoder 400 of FIG. 4).

Figure 12:
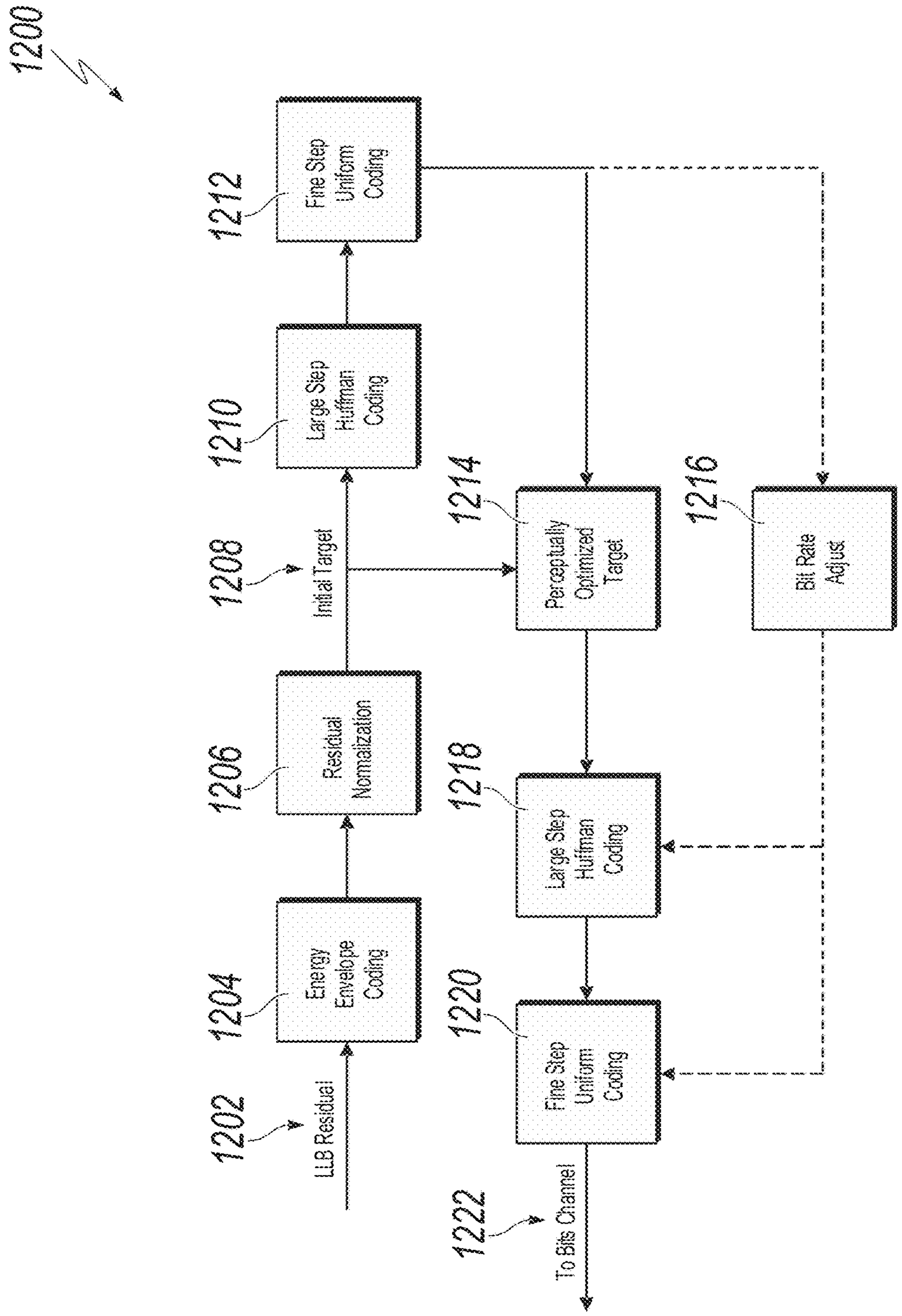
FIG. 12 shows an example structure of a residual quantization encoder according to some implementations.
Figure 13:
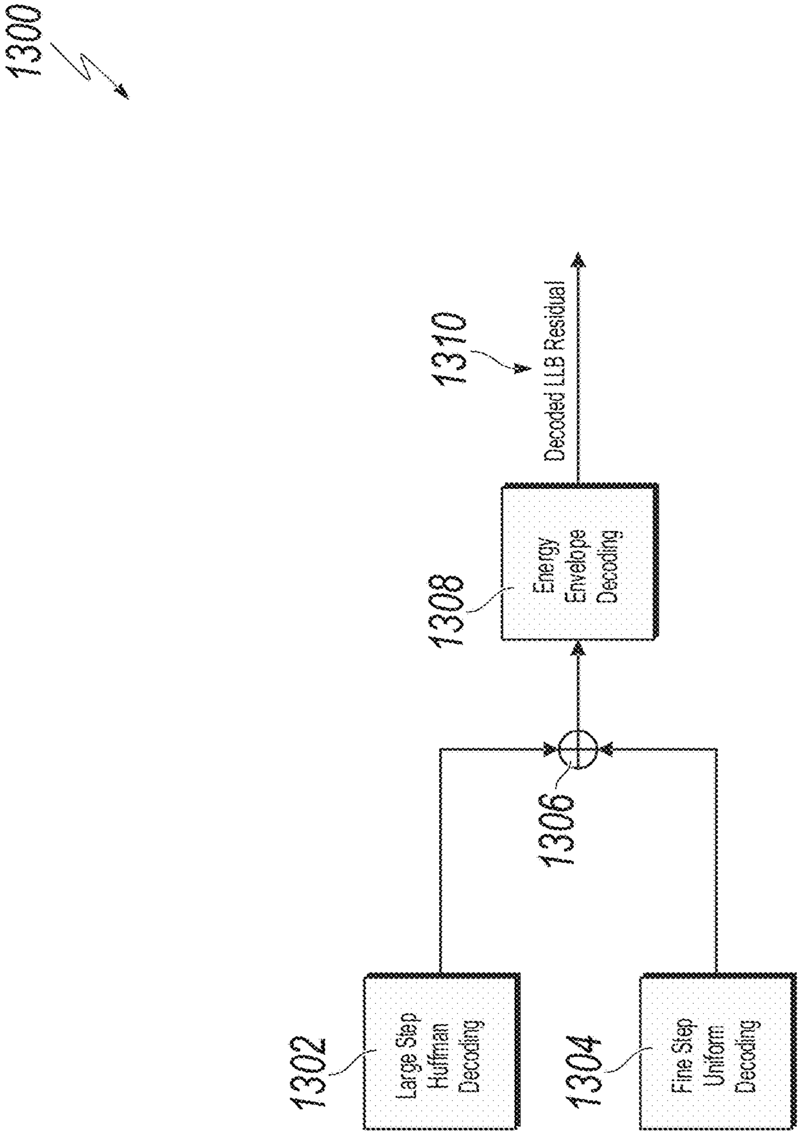
FIG. 13 shows an example structure of a residual quantization decoder according to some implementations.

FIG. 12 and FIG. 13 show example structures of residual quantization encoder 1200 and residual quantization decoder 1300. In some examples, the residual quantization encoder 1200 and residual quantization decoder 1300 may be used to process signals in the LLB subband. As shown, the residual quantization encoder 1200 includes an energy envelope coding component 1204, a residual normalization component 1206, a first large step coding component 1210, a first fine step component 1212, a target optimizing component 1214, a bit rate adjusting component 1216, a second large step coding component 1218, and a second fine step coding component 1220.

As shown, an LLB subband signal 1202 may be first processed by the energy envelope coding component 1204. In some cases, a time domain energy envelope of the LLB residual signal may be determined and quantized by the energy envelope coding component 1204. In some cases, the quantized time domain energy envelope may be sent to the decoder side (e.g., decoder 1300). In some examples, the determined energy envelope may have a dynamic range from 12 dB to 132 dB in residual domain, covering very low level and very high level. In some cases, every subframe in one frame has one energy level quantization and the peak subframe energy in the frame may be directly coded in dB domain. The other subframe energies in the same frame may be coded with Huffman coding approach by coding the difference between the peak energy and the current energy. In some cases, because one subframe duration may be as short as about 2 ms, the envelope precision may be acceptable based on human ear masking principle.

After having the quantized time domain energy envelope, the LLB residual signal may be then normalized by the residual normalization component 1206. In some cases, the LLB residual signal may be normalized based on the quantized time domain energy envelope. In some examples, the LLB residual signal may be divided by the quantized time domain energy envelope to generate a normalized LLB residual signal. In some cases, the normalized LLB residual signal may be used as the initial target signal 1208 for an initial quantization. In some cases, the initial quantization may include two stages of coding/quantization. In some cases, a first stage of coding/quantization includes a large step Huffman coding, and a second stage of coding/quantization includes a fine step uniform coding. As shown, the initial target signal 1208, which is the normalized LLB residual signal, may be processed by the large step Huffman coding component 1210 first. For the high resolution audio codec, every residual sample may be quantized. The Huffman coding may save bits by utilizing the special quantization index probability distribution. In some cases, when the residual quantization step size is large enough, the quantization index probability distribution becomes proper for Huffman coding. In some cases, the quantization result from the large step quantization may be sub-optimal. A uniform quantization may be added with smaller quantization step after the Huffman coding. As shown, the fine step uniform coding component 1212 may be used to quantize the output signal from the large step Huffman coding component 1210.

As such, the first stage of coding/quantization of the normalized LLB residual signal selects a relatively large quantization step because the special distribution of the quantized coding index leads to more efficient Huffman coding, and the second stage of coding/quantization uses relatively simple uniform coding with a relatively small quantization step in order to further reduce the quantization errors from the first stage coding/quantization.

In some cases, the initial residual signal may be an ideal target reference if the residual quantization has no error or has small enough error. If the coding bit rate is not high enough, the coding error may always exist and not insignificant. Therefore, this initial residual target reference signal 1208 may be sub-optimal perceptually for the quantization. Although the initial residual target reference signal 1208 is sub-optimal perceptually, it can provide a quick quantization error estimation, which may not only be used to adjust the coding bit rate (e.g., by the bit rate adjusting component 1216), but also be used to build a perceptually optimized target reference signal. In some cases, the perceptually optimized target reference signal may be generated by the target optimizing component 1214 based on the initial residual target reference signal 1208 and the output signal of the initial quantization (e.g., output signal of the fine step uniform coding component 1212).

In some cases, the optimized target reference signal may be built in a way not only to minimize the error influence of the current sample but also the previous samples and the future samples. Further, it may optimize the error distribution in spectrum domain for considering human ear perceptual masking effect.

After the optimized target reference signal is built by the target optimizing component 1214, the first stage Huffman coding and the second stage uniform coding may be performed again in order to replace the first (initial) quantization result and obtain a better perceptual quality. In this example, the second large step Huffman coding component 1218 and the second fine step uniform coding component 1220 may be used to perform the first stage Huffman coding and the second stage uniform coding on the optimized target reference signal to generate output 1222. The quantization of the initial target reference signal and the optimized target reference signal will be discussed below in greater detail.

In some examples, the unquantized residual signal or the initial target residual signal may be represented by $r_i(n)$. Using $r_i(n)$ as the target, the residual signal may be initially quantized to get the first quantized residual signal noted as r; (n). Based on $r_i(n)$, $r_{\hat{i}}(n)$, and an impulsive response $h_w(n)$ of a perceptual weighting filter, a perceptually optimized target residual signal $r_o(n)$ can be evaluated. Using $r_o(n)$ as the updated or optimized target, the residual signal may be quantized again to get the second quantized residual signal noted as $r_{\hat{o}}$ (n), which has been perceptually optimized to replace the first quantized residual signal r; (n). In some cases, $h_w(n)$ may be determined in many possible ways, for example, by estimating $h_w(n)$ based on the LPC filter.

In some cases, the LPC filter for LLB subband may be expressed as the following:

$$\frac{1}{A(z)} = \frac{1}{1 + \sum_{i=1}^{P} a_i \cdot z^{-i}} \tag{1}$$

The perceptually weighted filter W(z) can be defined as:

$$W(z) = \frac{1}{A(z/a)} \cdot \frac{1}{1 + \alpha \cdot \gamma \cdot z^{-1}} \tag{2}$$

where $\alpha$ is a constant coefficient, $0<\alpha<1$. $\gamma$ can be the first reflection coefficient of the LPC filter or simply a constant, $-1<\gamma<1$. The impulsive response of the filter W(z) may be defined as $h_w(n)$. In some cases, the length of $h_w(n)$ depends on the values of $\alpha$ and $\gamma$. In some cases, when $\alpha$ and $\gamma$ are close to zero, the length of $h_w(n)$ becomes short and decays to zero quickly. From point view of computational complexity, it is optimal to have a short impulsive response $h_w(n)$. In case that $h_w(n)$ is not short enough, it can be multiplied with a half-hamming window or a half-hanning window in order to make $h_w(n)$ decay to zero quickly. After having the impulsive response $h_w(n)$, the target in the perceptually weighted signal domain may be expressed as $$T_g(n)=r_i(n)*h_w(n)=\Sigma_k r_i(k)\cdot h_w(n-k) \tag{3}$$

which is a convolution between $r_i(n)$ and $h_w(n)$. The contribution of the initially quantized residual $r_{\hat{i}}(n)$ in the perceptually weighted signal domain can be expressed as $$\hat{T}_g(n)=\hat{r}_i(n)*h_w(n)=\Sigma_k \hat{r}_i(k)\cdot h_w(n-k) \tag{4}$$

The error in residual domain $$Er=\|\hat{r}_i(n)-r_i(n)\|^2 \tag{5}$$

is minimized as it is quantized in direct residual domain. However, the error in the perceptually weighted signal domain $$Et=\|\hat{T}_g(n)-T_g(n)\|^2 \tag{6}$$

may not be minimized. Therefore, the quantization error may need to be minimized in the perceptually weighted signal domain. In some cases, all residual samples may be jointly quantized. However, this may cause extra complexity. In some cases, the residual may be quantized in the way of sample by sample, but perceptually optimized. For example, $r_{\hat{o}}(n)=r_{\hat{i}}(n)$ may be initially set for all samples in the current frame. Supposing all the samples have been quantized except the sample at m is not quantized, the perceptually best value now at m is not $r_i(m)$ but should be $$r_o(m) = \frac{<T'_g(n),\, h_w(n)>}{\|h_w(n)\|^2} \tag{7}$$

where $<T_g'(n), h_w(n)>$ represents cross-correlation between the vector $\{T_g'(n)\}$ and the vector $\{h_w(n)\}$, in which the vector length equals the length of the impulsive response $h_w(n)$ and the vector starting point of $\{T_g'(n)\}$ is at m. $\|h_w(n)\|$ is the energy of the vector $\{h_w(n)\}$, which is a constant energy in the same frame. $T_g'(n)$ can be expressed as $$T_g'(n)=T_g(n)-\Sigma_{k\neq m}\hat{r}_o(k)\cdot h_w(n-k) \tag{8}$$

Once the perceptually optimized new target value $r_o(m)$ is determined, it may be quantized again to generate $r_{\hat{o}}(m)$ in a way similar to the initial quantization including large step Huffman coding and fine step uniform coding. Then, m will go to next sample position. The above processing is repeated sample by sample, while expressions (7) and (8) are updated with new results until all the samples are optimally quantized. During each updating for each m, expression (8) does not need to be re-calculated because most samples in $\{r_{\hat{o}}(k)\}$ are not changed. The denominator in expression (7) is a constant so that the division can become a constant multiplication.

At the decoder side as shown in FIG. 13, the quantized values from the large step Huffman decoding 1302 and the fine step uniform decoding 1304 are added together by addition function unit 1306 to form the normalized residual signal. The normalized residual signal may be processed by the energy envelope decoding component 1308 in the time domain to generate the decoded residual signal 1310.

Figure 14:
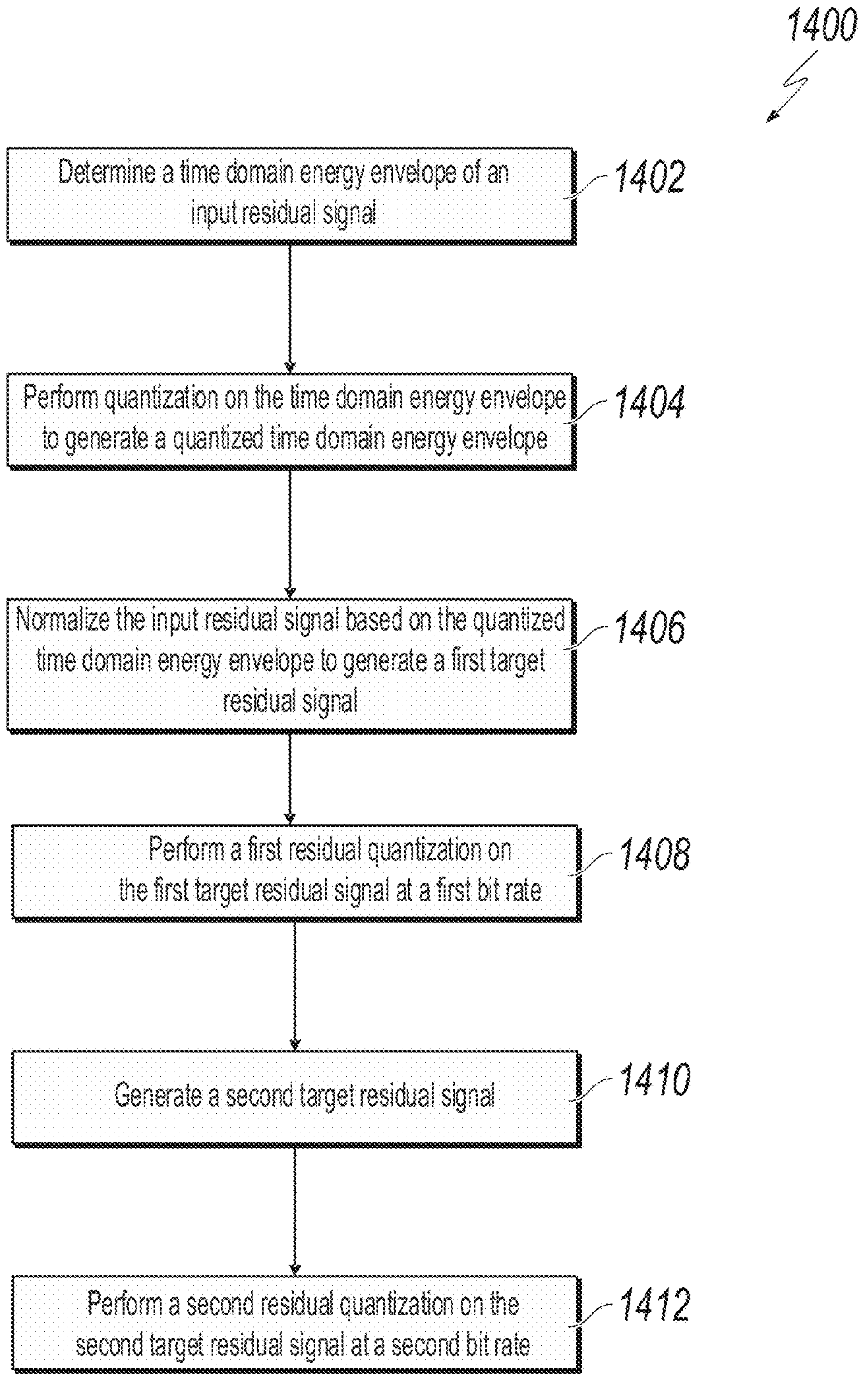
FIG. 14 is a flowchart illustrating an example method of performing residual quantization for a signal according to some implementations.

FIG. 14 is a flowchart illustrating an example method 1400 of performing residual quantization for a signal. In some cases, the method 1400 may be implemented by an audio codec device (e.g., LLB encoder 300 or residual quantization encoder 1200). In some cases, the method 1100 can be implemented by any suitable device.

The method 1400 starts at block 1402 where a time domain energy envelope of an input residual signal is determined. In some cases, the input residual signal may be a residual signal in the LLB subband (e.g., LLB residual signal 1202).

At block 1404, the time domain energy envelope of the input residual signal is quantized to generate a quantized time domain energy envelope. In some cases, the quantized time domain energy envelope may be sent to the decoder side (e.g., decoder 1300).

At block 1406, the input residual signal is normalized based on the quantized time domain energy envelope to generate a first target residual signal. In some cases, the LLB residual signal may be divided by the quantized time domain energy envelope to generate a normalized LLB residual signal. In some cases, the normalized LLB residual signal may be used as an initial target signal for an initial quantization.

At block 1408, a first quantization is performed on the first target residual signal at a first bit rate to generate a first quantized residual signal. In some cases, the first residual quantization may include two stages of sub-quantization/coding. A first stage of sub-quantization may be performed on the first target residual signal at a first quantization step to generate a first sub-quantization output signal. A second stage of sub-quantization may be performed on the first sub-quantization output signal at a second quantization step to generate the first quantized residual signal. In some cases, the first quantization step is larger than the second quantization step in size. In some examples, the first stage of sub-quantization may be large step Huffman coding, and the second stage of sub-quantization may be fine step uniform coding.

In some cases, the first target residual signal includes a plurality of samples. The first quantization may be performed on the first target residual signal sample by sample. In some cases, this may reduce the complexity of the quantization, thereby improving quantization efficiency.

At block 1410, a second target residual signal is generated based at least on the first quantized residual signal and the first target residual signal. In some cases, the second target residual signal may be generated based on the first target residual signal, the first quantized residual signal, and an impulsive response $h_w(n)$ of a perceptual weighting filter. In some cases, a perceptually optimized target residual signal, which is the second target residual signal, may be generated for a second residual quantization.

At block 1412, a second residual quantization is performed on the second target residual signal at a second bit rate to generate a second quantized residual signal. In some cases, the second bit rate may be different from the first bit rate. In one example, the second bit rate may be higher than the first bit rate. In some cases, the coding error from the first residual quantization at the first bit rate may not insignificant. In some cases, the coding bit rate may be adjusted (e.g., raised) at the second residual quantization to reduce the coding rate.

In some cases, the second residual quantization is similar to the first residual quantization. In some examples, the second residual quantization may also include two stages of sub-quantization/coding. In these examples, a first stage of sub-quantization may be performed on the second target residual signal at a large quantization step to generate a sub-quantization output signal. A second stage of sub-quantization may be performed on the sub-quantization output signal at a small quantization step to generate the second quantized residual signal. In some cases, the first stage of sub-quantization may be large step Huffman coding, and the second stage of sub-quantization may be fine step uniform coding. In some cases, the second quantized residual signal may be sent to the decoder side (e.g., decoder 1300) through a bitstream channel.

As noted in FIGS. 3-4, the LTP may be conditionally turned on and off for better PLC. In some cases, when the codec bit rate is not high enough to achieve transparent quality, LTP is very helpful for periodic and harmonic signals. For high resolution codec, two issues may need to be solved for LTP application: (1) the computational complexity should be reduced as a traditional LTP could cost very high computational complexity in high sampling rate environment; and (2) the negative influence for packet loss concealment (PLC) should be limited because LTP exploits inter-frame correlation and may cause the error propagation when packet loss in transmission channel happens.

In some cases, pitch lag searching adds extra computational complexity to LTP. A more efficient may be desirable in LTP to improve coding efficiency. An example process of pitch lag searching is described below with reference to FIGS. 15-16.

Figure 15:
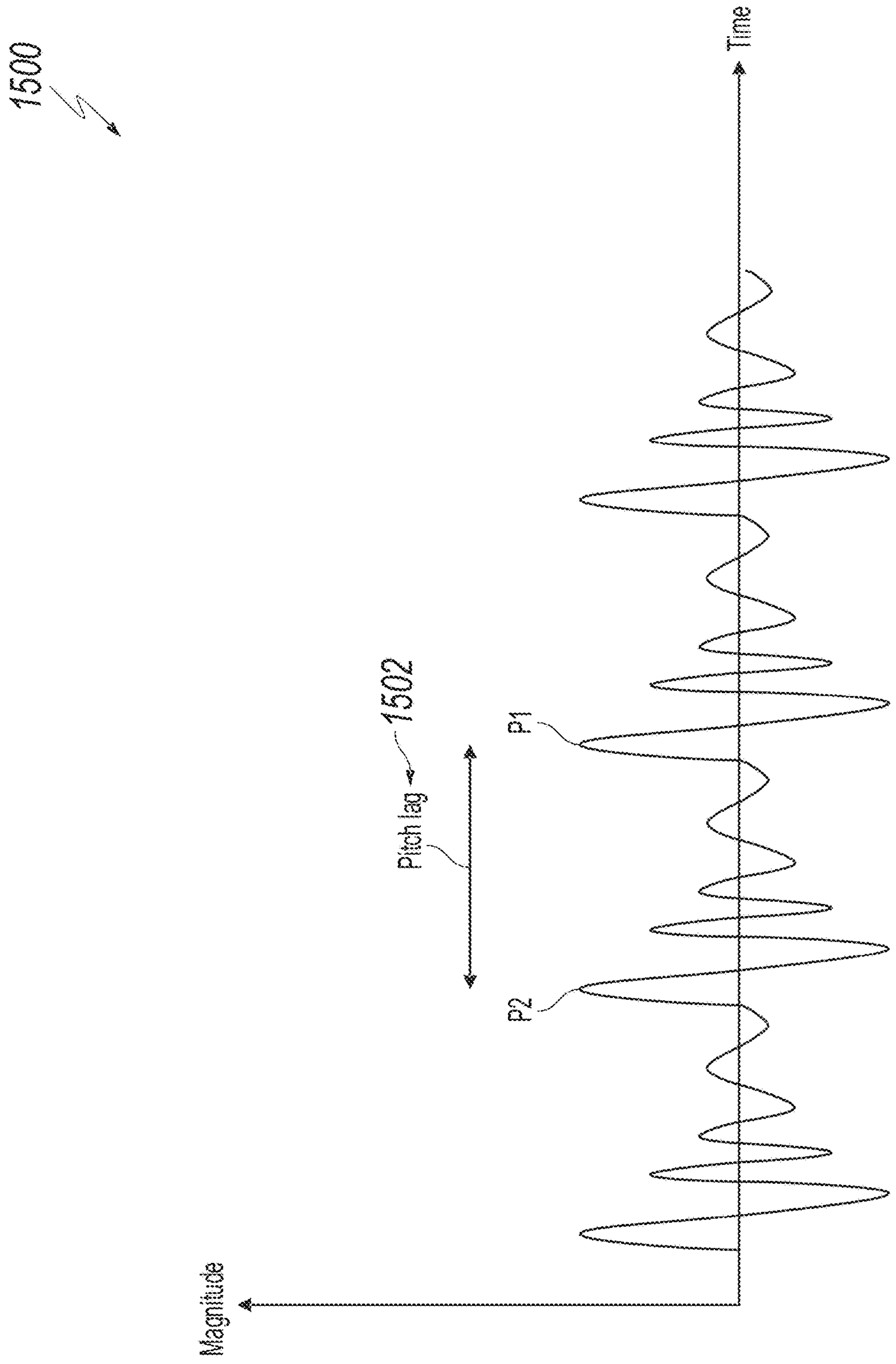
FIG. 15 shows an example of a voiced speech according to some implementations.

FIG. 15 shows an example of voiced speech 1500 in which pitch lag 1502 represents the distance between two neighboring periodic cycles (e.g., distance between peaks P1 and P2). Some music signals may not only have strong periodicity but also stable pitch lag (almost constant pitch lag).

Figure 16:
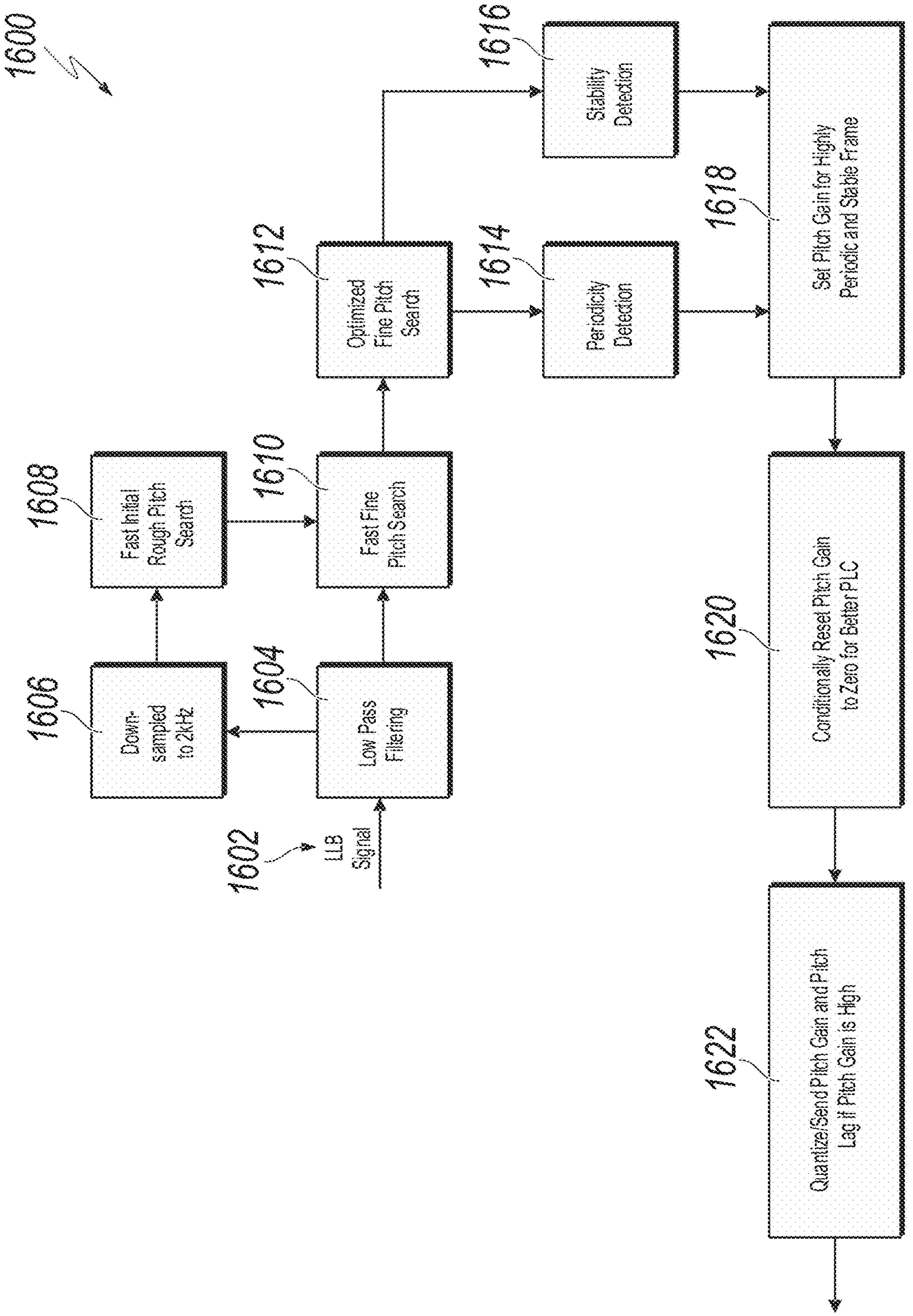
FIG. 16 shows an example process of performing long-term prediction (LTP) control according to some implementations.

FIG. 16 shows an example process 1600 of performing LTP control for better packet loss concealment. In some cases, the process 1600 may be implemented by a codec device (e.g., encoder 100, or encoder 300). In some cases, the process 1600 may be implemented by any suitable device. The process 1600 includes a pitch lag (which will be described below as "pitch" for short) searching and an LTP control. Generally, pitch searching can be complicated at high sampling rate with traditional way due to large number of pitch candidates. The process 1600 as described herein may include three phases/steps. During a first phase/step, a signal (e.g., the LLB signal 1602) may be low-pass filtered 1604 as the periodicity is mainly in low frequency region. Then, the filtered signal may be down-sampled 1606 to generate an input signal for a fast initial rough pitch searching 1608. In one example, the down-sampled signal is generated at 2 kHz sampling rate. Because the total number of pitch candidates at the low sampling rate is not high, a rough pitch result may be obtained in a fast way by searching for all pitch candidates with the low sampling rate. In some cases, the initial pitch searching 1608 may be done using traditional approach of maximizing normalized cross-correlation with short window or auto-correlation with a large window.

As the initial pitch search result can be relatively rough, a fine searching with a cross-correlation approach in the neighborhood of the multiple initial pitches may still be complicated at a high sampling rate (e.g., 24 kHz). Therefore, during a second phase/step (e.g., fast fine pitch search 1610), the pitch precision may be increased in waveform domain by simply looking at waveform peak locations at the low sampling rate. Then, during a third phase/step (e.g., optimized find pitch search 1612), the fine pitch search result from the second phase/step may be optimized with the cross-correlation approach within a small searching range at the high sampling rate.

For example, during the first phase/step (e.g., initial pitch search 1608), an initial rough pitch search result may be obtained based on all the pitch candidates that have been searched for. In some cases, a pitch candidate neighborhood may be defined based on the initial rough pitch search result and may be used for the second phase/step to obtain a more precise pitch search result. During the second phase/step (e.g., fast fine pitch search 1610), waveform peak locations may be determined based on the pitch candidates and within the pitch candidate neighborhood as determined in the first phase/step. In one example as shown in FIG. 15, the first peak location P1 in FIG. 15 may be determined within a limited searching range defined from the initial pitch search result (e.g., the pitch candidate neighborhood determined about 15% variation from the first phase/step). The second peak location P2 in FIG. 15 may be determined in a similar way. The location difference between P1 and P2 becomes a much more precise pitch estimate than the initial pitch estimate. In some cases, the more precise pitch estimate obtained from the second phase/step may be used to define a second pitch candidate neighborhood that can be used in the third phase/step to find an optimized fine pitch lag, e.g., the pitch candidate neighborhood determined about 15% variation from the second phase/step. During the third phase/step (e.g., optimized fine pitch search 1612), the optimized fine pitch lag can be searched with the normalized cross-correlation approach within a very small searching range (e.g., the second pitch candidate neighborhood).

In some cases, if the LTP is always on, PLC may be sub-optimal due to possible error propagation when bitstream packet is lost. In some cases, the LTP may be turned on when it can efficiently improve the audio quality and will not impact PLC significantly. In practice, the LTP may be efficient when the pitch gain is high and stable, which means the high periodicity lasts at least for several frames (not just for one frame). In some cases, in the high periodicity signal region, PLC is relatively simple and efficient as PLC always uses the periodicity to copy the previous information into the current lost frame. In some cases, the stable pitch lag may also reduce the negative impact to PLC. The stable pitch lag means that the pitch lag value does not change significantly at least for several frames, likely resulting in stable pitch in the near future. In some cases, when the current frame of bitstream packet is lost, PLC may use the previous pitch information for recovering the current frame. As such, the stable pitch lag may help the current pitch estimation for PLC.

Continuing the example with reference to FIG. 16, the periodicity detection 1614 and the stability detection 1616 are performed before deciding to turn on or off the LTP. In some cases, when the pitch gain is stably high and the pitch lag is relatively stable, the LTP may be turned on. For example, pitch gain may be set for highly periodic and stable frames (e.g., the pitch gain is stably high than 0.8), as shown in block 1618. In some cases, referring to FIG. 3, an LTP contribution signal may be generated and combined with a weighted residual signal to generate an input signal for residual quantization. On the other hand, if the pitch gain is not stably high and/or the pitch lag is not stable, the LTP may be turned off.

In some cases, the LTP may be also turned off for one or two frames if the LTP has been previously turned on for several frames in order to avoid possible error propagation when bitstream packet is lost. In one example, as shown in block 1620, the pitch gain may be conditionally reset to zero for better PLC, e.g., when LTP has been previously turned on for several frames. In some cases, when the LTP is turned off, a little more coding bit rate may be set in the variable bit rate coding system. In some cases, when the LTP is decided to be turned on, the pitch gain and the pitch lag may be quantized and sent to the decoder side as shown in block 1622.

Figure 17:
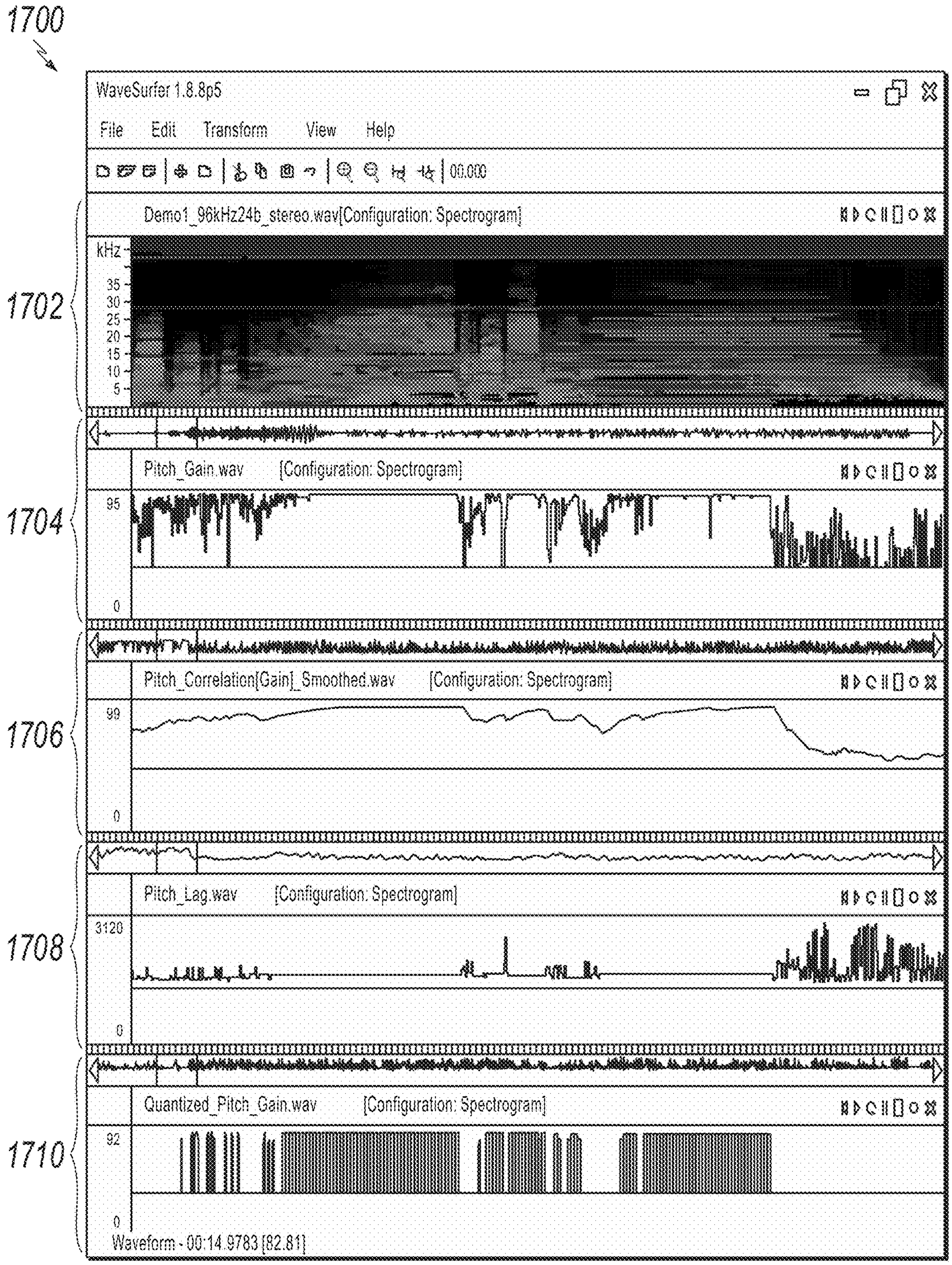
FIG. 17 shows an example spectrum of an audio signal according to some implementations.

FIG. 17 shows example spectrograms of an audio signal 1700. As shown, spectrogram 1702 shows time-frequency plot of the audio signal. Spectrogram 1702 is shown to include lots of harmonics, which indicates high periodicity of the audio signal. Spectrogram 1704 shows original pitch gain of the audio signal. The pitch gain is shown to be stably high for most of the time, which also indicates high periodicity of the audio signal. Spectrogram 1706 shows smoothed pitch gain (pitch correlation) of the audio signal. In this example, the smoothed pitch gain represents normalized pitch gain. Spectrogram 1708 shows pitch lag and spectrogram 1710 shows quantized pitch gain. The pitch lag is shown to be relatively stable for most of the time. As shown the pitch gain has been reset to zero periodically, which indicates the LTP is turned off, to avoid error propagation. The quantized pitch gain is also set to zero when the LTP is turned off.

Figure 18:
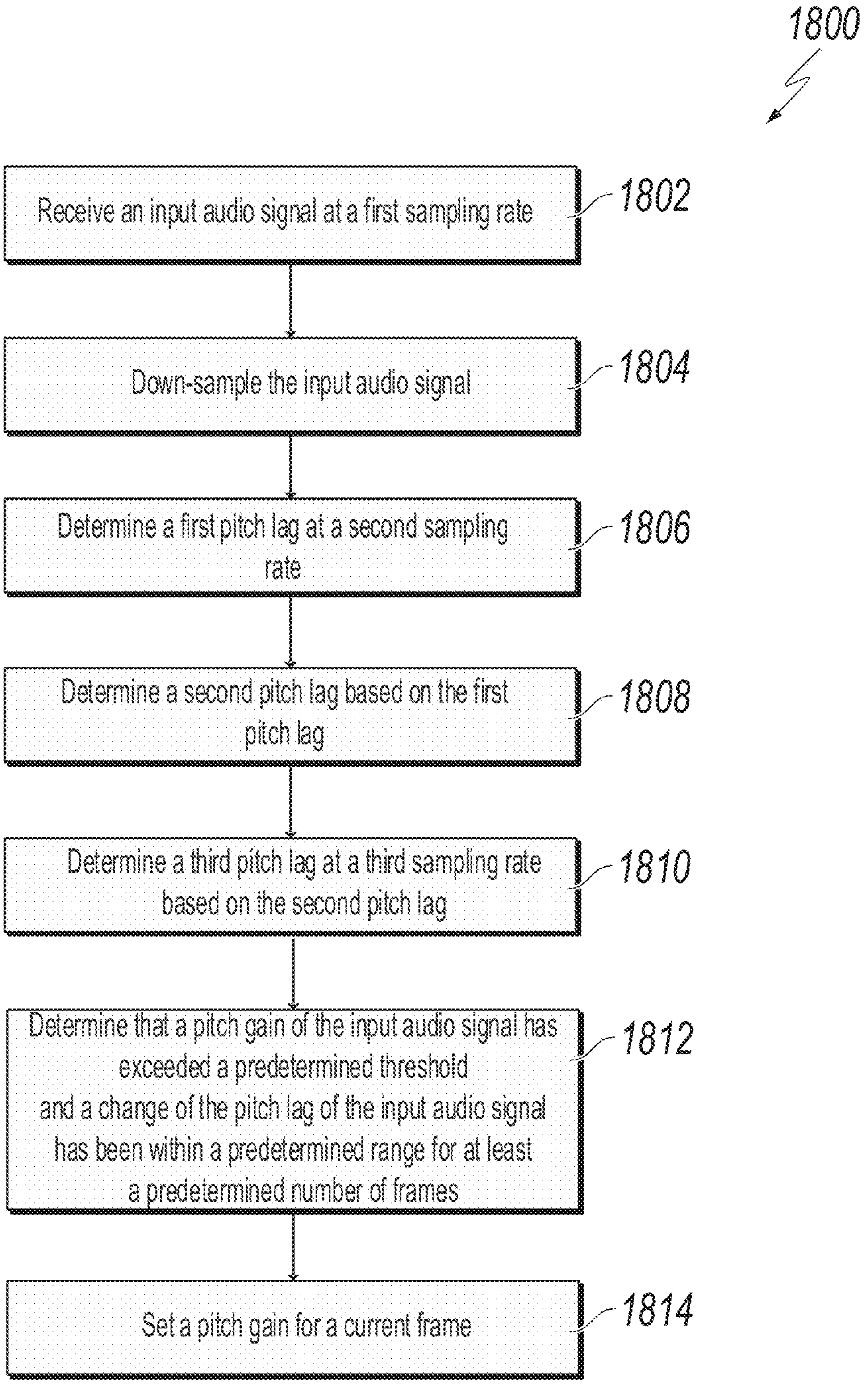
FIG. 18 is a flowchart illustrating an example method of performing long-term prediction (LTP) according to some implementations.

FIG. 18 is a flowchart illustrating an example method 1800 of performing LTP. In some cases, the method 1400 may be implemented by an audio codec device (e.g., LLB encoder 300). In some cases, the method 1100 can be implemented by any suitable device.

The method 1800 begins at block 1802 where an input audio signal is received at a first sampling rate. In some cases, the audio signal may include a plurality of first sample, where the plurality of first samples are generated at the first sample rate. In one example, the plurality of first samples may be generated at a sampling rate of 96 kHz.

At block 1804, the audio signal is down-sampled. In some cases, the plurality of first samples of the audio signal may be down-sampled to generate a plurality of second samples at a second sampling rate. In some cases, the second sampling rate is lower than the first sampling rate. In this example, the plurality of second samples may be generated at a sampling rate of 2 kHz.

At block 1806, a first pitch lag is determined at the second sampling rate. Because the total number of pitch candidates at the low sampling rate is not high, a rough pitch result may be obtained in a fast way by searching for all pitch candidates with the low sampling rate. In some cases, a plurality of pitch candidates may be determined based on the plurality of second samples at the second sampling rate. In some cases, the first pitch lag may be determined on the plurality of pitch candidates. In some cases, the first pitch lag may be determined by maximizing normalized cross-correlation with a first window or auto-correlation with a second window, where the second window is larger than the first window.

At block 1808, a second pitch lag is determined based on the first pitch lag as determined at block 1804. In some cases, a first search range may be determined based on the first pitch lag. In some cases, a first peak location and a second peak location may be determined within the first search range. In some cases, the second pitch lag may be determined based on the first peak location and the second peak location. For example, a location difference between the first peak location and the second peak location may be used to determine the second pitch lag.

At block 1810, a third pitch lag is determined based on the second pitch lag as determined at block 1808. In some cases, the second pitch lag may be used to define a pitch candidate neighborhood that can be used in find an optimized fine pitch lag. For example, a second search range may be determined based on the second pitch lag. In some cases, the third pitch lag may be determined within the second search range at a third sampling rate. In some cases, the third sampling rate is higher than the second sampling rate. In this example, the third sampling rate may be 24 kHz. In some cases, the third pitch lag may be determined using a normalized cross-correlation approach within the second search range at the third sampling rate. In some cases, the third pitch lag may be determined as the pitch lag of the input audio signal.

At block 1812, it is determined that a pitch gain of the input audio signal has exceeded a predetermined threshold and that a change of the pitch lag of the input audio signal has been within a predetermined range for the at least a predetermined number of frames. The LTP may be more efficient when the pitch gain is high and stable, which means the high periodicity lasts at least for several frames (not just for one frame). In some cases, the stable pitch lag may also reduce the negative impact to PLC. The stable pitch lag means that the pitch lag value does not change significantly at least for several frames, likely resulting in stable pitch in the near future.

At block 1814, a pitch gain is set for a current frame of the input audio signal in response to determining that a pitch gain of the input audio signal has exceeded the predetermined threshold and that the change of the third pitch lag has been within the predetermined range for the at least a predetermined number of previous frames. As such, pitch gain is set for highly periodic and stable frames to improve signal quality while not impacting PLC.

In some cases, in response to determining that the pitch gain of the input audio signal is lower than the predetermined threshold and/or that the change of the third pitch lag has not been within the predetermined range for at least the predetermined number of previous frames, the pitch gain is set to zero for the current frame of the input audio signal. As such, error propagation may be reduced.

As noted, every residual sample is quantized for the high resolution audio codec. This means that the computational complexity and the coding bit rate of the residual sample quantization may not change significantly when the frame size changes from 10 ms to 2 ms. However, the computational complexity and the coding bit rate of some codec parameters such as LPC may dramatically increase when the frame size changes from 10 ms to 2 ms. Usually LPC parameters need to be quantized and transmitted for every frame. In some cases, LPC differential coding between current frame and previous frame may save bits but it may also cause error propagation when bitstream packet is lost in transmission channel. Therefore, short frame size may be set to achieve a low delay codec. In some cases, when the frame size is as short such as 2 ms, the coding bit rate of the LPC parameters may be very high and the computational complexity may be also high as the frame time duration is at the denominator of the bit rate or the complexity.

In one example with reference to the time domain energy envelope quantization shown in FIG. 12, if the subframe size is 2 ms, a 10 ms frame should contain 5 subframes. Normally, each subframe has an energy level that needs to be quantized. As one frame contains 5 subframes, the 5 subframes' energy levels may be jointly quantized so that the coding bit rate of the time domain energy envelope is limited. In some cases, when the frame size equals the subframe size or one frame contains one subframe, the coding bit rate may increase significantly if each energy level is quantized independently. In these cases, differential coding of the energy levels between consecutive frames may reduce the coding bit rate. However, such an approach may be sub-optimal as it may cause error propagation when bitstream packet is lost in transmission channel.

Figure 19:
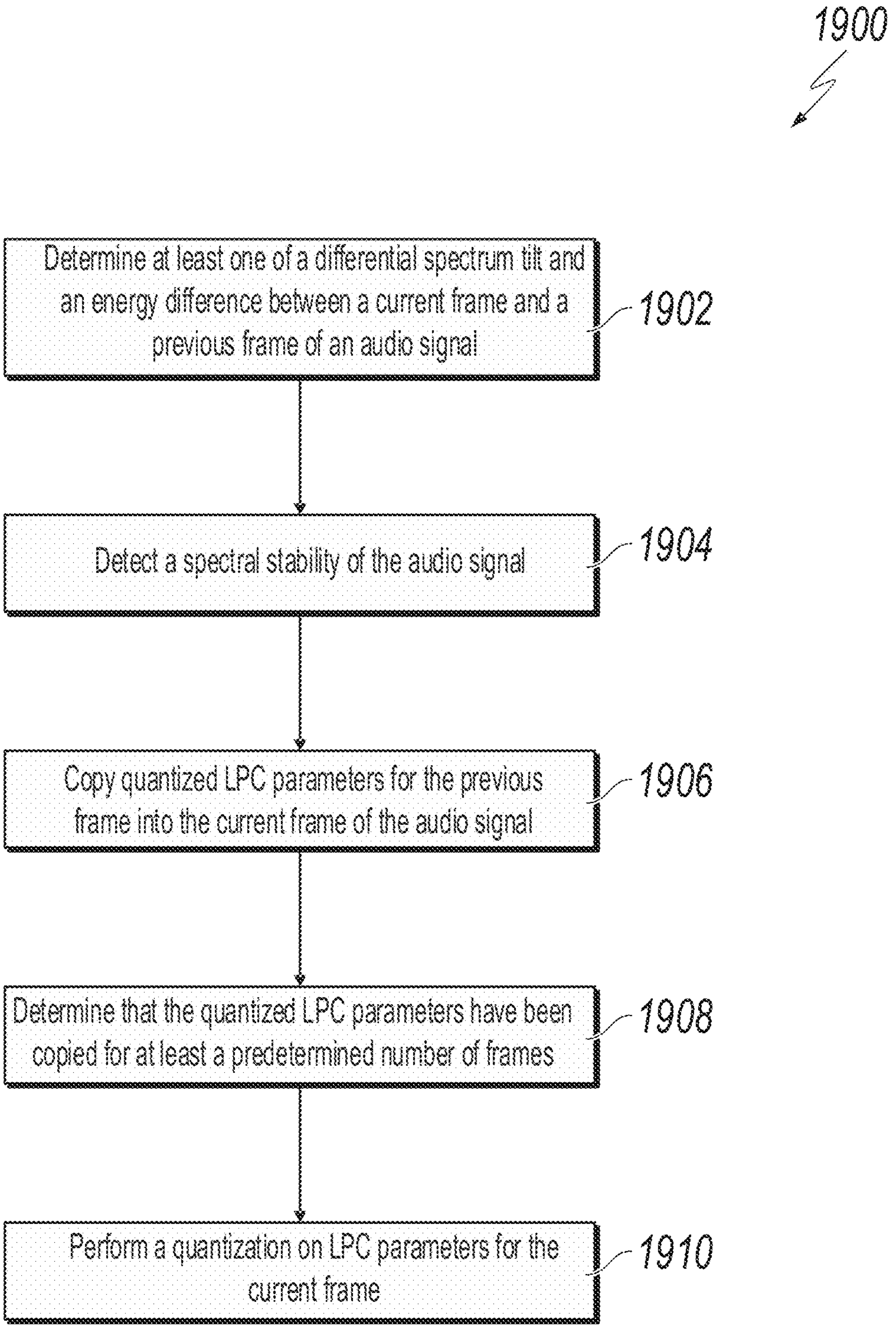
FIG. 19 is a flowchart illustrating an example method of quantization of linear predictive coding (LPC) parameters according to some implementations.

In some cases, vector quantization of the LPC parameters may deliver lower bit rate. It may take more computational load though. Simple scalar quantization of the LPC parameters may have lower complexity but require higher bit rate. In some cases, a special scalar quantization profiting from Huffman coding may be used. However, this method may not be enough for very short frame size or very low delay coding. A new method 1900 of quantization of LPC parameters will be described below with reference to FIGS. 19-20.

Figure 20:
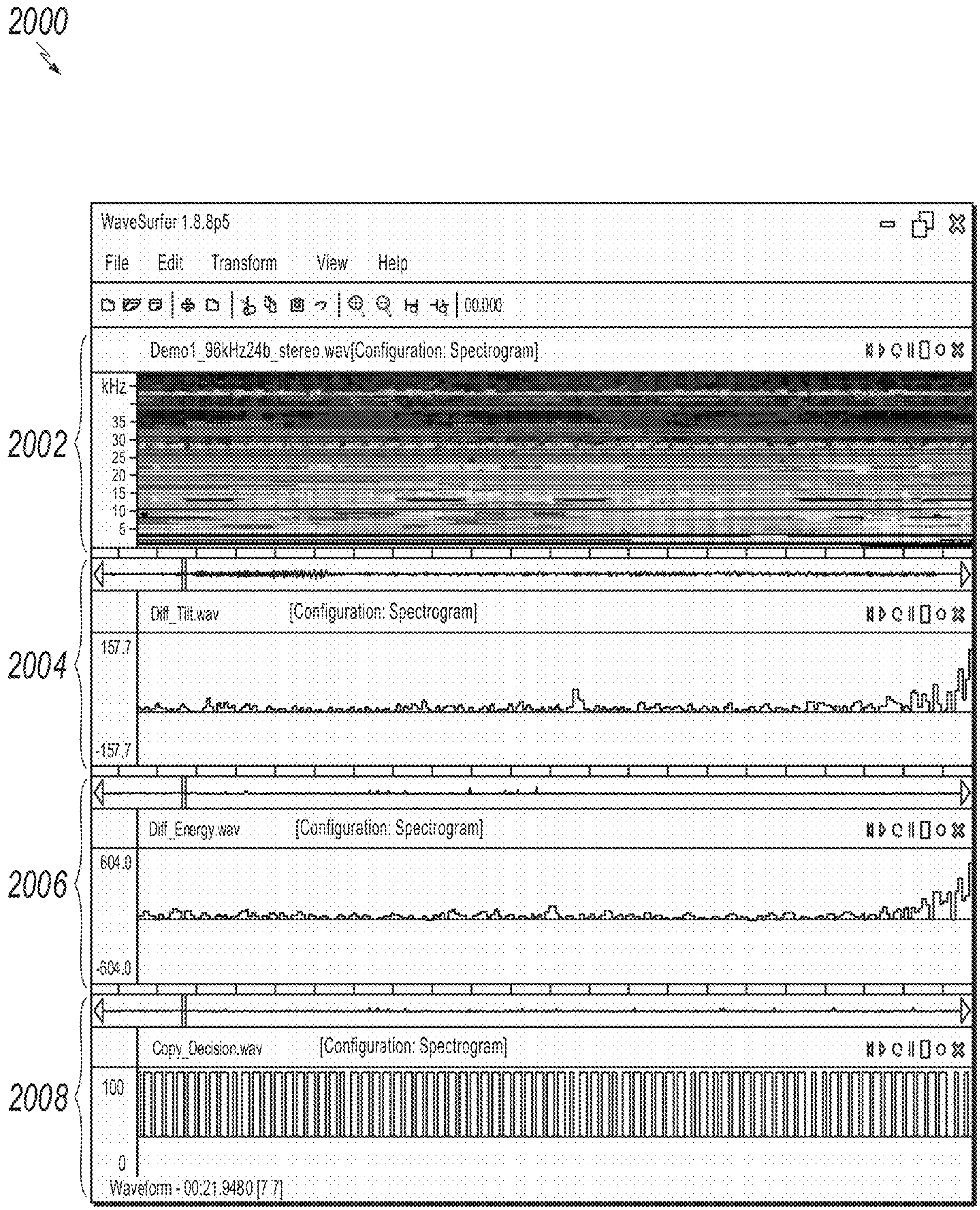
FIG. 20 shows an example spectrum of an audio signal according to some implementations.

At block 1902, at least one of a differential spectrum tilt and an energy difference between a current frame and a previous frame of an audio signal is determined. Referring to FIG. 20, spectrogram 2002 shows a time-frequency plot of the audio signal. Spectrogram 2004 shows an absolute value of differential spectrum tilt between current frame and previous frame of the audio signal. Spectrogram 2006 shows an absolute value of energy difference between current frame and previous frame of the audio signal. Spectrogram 2008 shows a copy decision in which 1 indicates the current frame will copy the quantized LPC parameters from the previous frame and 0 means the current frame will quantize/send the LPC parameters again. In this example, the absolute values of both the differential spectrum tilt and the energy difference are relatively very small during most time, and they become relatively larger at the end (right side).

At block 1904, a stability of the audio signal is detected. In some cases, the spectral stability of the audio signal may be determined based on the differential spectrum tile and/or the energy difference between the current frame and the previous frame of the audio signal. In some cases, the spectral stability of the audio signal may be further determined based on the frequency of the audio signal. In some cases, an absolute value of the differential spectrum tilt may be determined based on a spectrum of the audio signal (e.g., the spectrogram 2004). In some cases, an absolute value of the energy difference between current frame and previous frame of the audio signal may be also determined based on a spectrum of the audio signal (e.g., spectrogram 2006). In some cases, if it is determined that a change of the absolute value of the differential spectrum tilt and/or a change of the absolute value of the energy difference has been within a predetermined range for at least a predetermined number of frames, the spectral stability of the audio signal may be determined to be detected.

At block 1906, quantized LPC parameters for the previous frame are copied into the current frame of the audio signal in response to detecting the spectral stability of the audio signal. In some cases, when the spectrum of the audio signal is very stable and it does not change meaningfully from one frame to next frame, the current LPC parameters for the current frame may not be coded/quantized. Instead, the previous quantized LPC parameters may be copied into the current frame because the unquantized LPC parameters keep almost the same information from the previous frame to the current frame. In such cases, only 1 bit may be sent to tell the decoder that the quantized LPC parameters are copied from the previous frame, resulting in very low bit rate and very low complexity for the current frame.

If the spectral stability of audio signal is not detected, the LPC parameters may be forced to be quantized and coded again. In some cases, if it is determined that a change of the absolute value of the differential spectrum tilt between the current frame and the previous frame for the audio signal has not been within a predetermined range for at least a predetermined number frames, it may be determined that the spectral stability of the audio signal is not detected. In some cases, if it is determined that a change of the absolute value of the energy difference has not been within a predetermined range for at least a predetermined number of frames, it may be determined that the spectral stability of the audio signal is not detected.

At block 1908, it is determined that the quantized LPC parameters has been copied for at least a predetermined number of frames prior to the current frame. In some cases, if the quantized LPC parameters have been copied for several frames, the LPC parameters may be forced to be quantized and coded again.

At block 1910, a quantization is performed on the LPC parameters for the current frame in response to determining that the quantized LPC parameters has been copied for at least the predetermined number of frames. In some cases, the number of consecutive frames for copying the quantized LPC parameters is limited in order to avoid error propagation when bitstream packet is lost in transmission channel.

In some cases, the LPC copy decision (as shown in spectrogram 2008) may help quantizing the time domain energy envelope. In some cases, when the copy decision is 1, a differential energy level between current frame and previous frame may be coded to save bits. In some cases, when the copy decision is 0, a direct quantization of the energy level may be performed to avoid error propagation when bitstream packet is lost in transmission channel.

Figure 21:
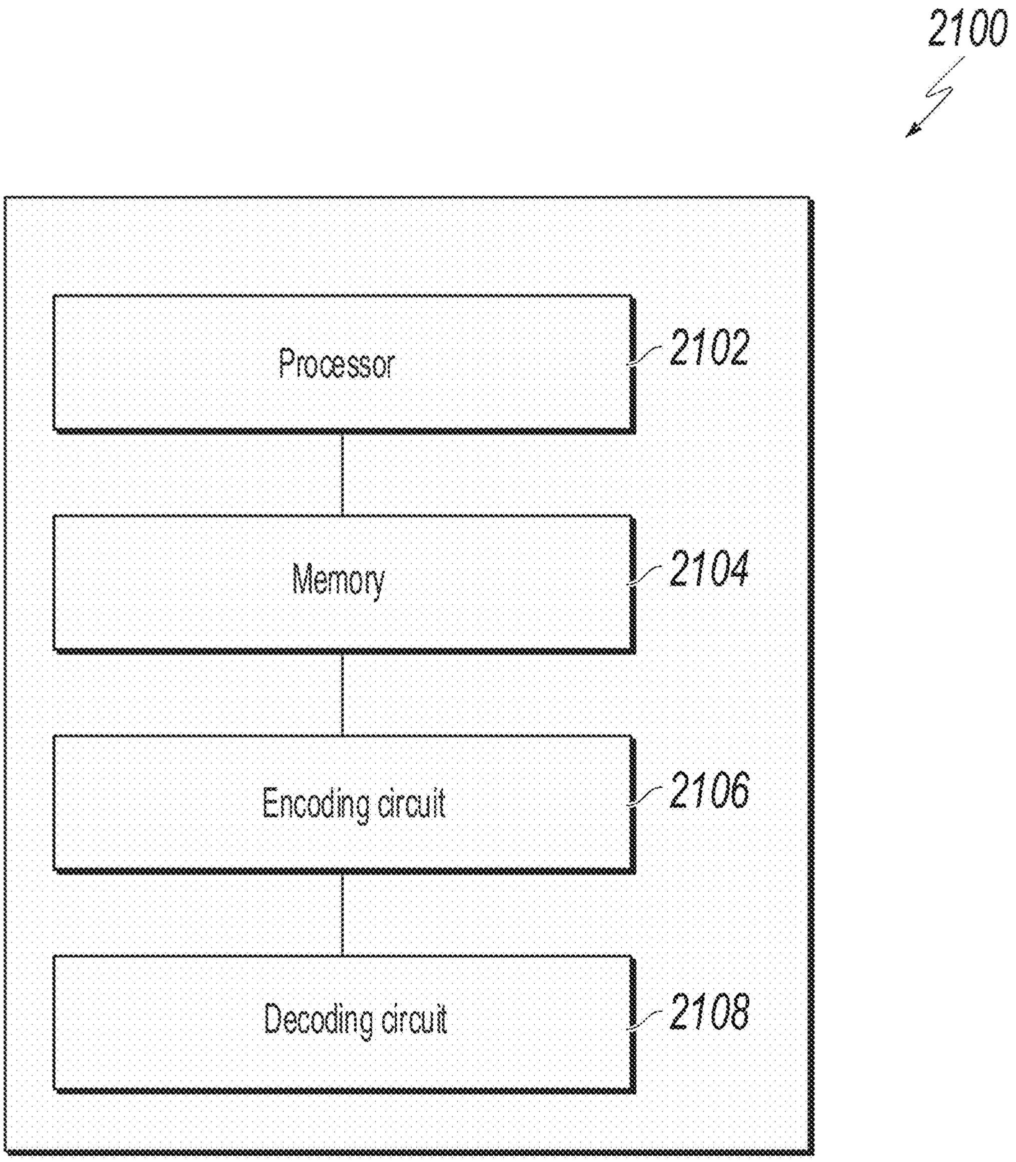
FIG. 21 is a diagram illustrating an example structure of an electronic device according to some implementation.

FIG. 21 is a diagram illustrating an example structure of an electronic device 2100 described in the present disclosure, according to an implementation. The electronic device 2100 includes one or more processors 2102, a memory 2104, an encoding circuit 2106, and a decoding circuit 2108. In some implementations, electronic device 2100 can further include one or more circuits for performing any one or a combination of steps described in the present disclosure.

Described implementations of the subject matter can include one or more features, alone or in combination.

In a first implementation, a method for audio coding includes: receiving an audio signal, the audio signal comprising one or more subband signals; generating a residual signal of at least one of the one or more subband signals based on the at least one of the one or more subband signals; determining that the at least one of the one or more subband signals is a high pitch signal; and in response to determining that the at least one of the one or more subband signals is a high pitch signal, performing weighting on the residual signal of the at least one of the one or more subband signal to generate a weighted residual signal.

The foregoing and other described implementations can each, optionally, include one or more of the following features:

A first feature, combinable with any of the following features, where the one or more subband signals include at least one of the following: a low low band (LLB) signal; a low high band (LHB) signal; a high low band (HLB) signal; or a high high band (HHB) signal.

A second feature, combinable with any of the previous or following features, where generating the residual signal of the at least one of the one or more subband signals based on the at least one of the one or more subband signals includes: performing inverse linear predictive coding (LPC) filtering on the at least one of the one or more subband signals to generate the residual signal of the at least one of the one or more subband signals.

A third feature, combinable with any of the previous or following features, where generating the weighted residual signal of the at least one of the one or more subband signals includes: generating a tilt-filtered signal of the at least one of the one or more subband signals based on the at least one of the one or more subband signals.

A fourth feature, combinable with any of the previous or following features, where determining that the at least one of the one or more subband signals is a high pitch signal includes: determining that the at least one of the one or more subband signals is a high pitch signal based on at least one of a current pitch gain, a smoothed pitch gain, a pitch lag length, or a spectral tilt of the at least one of the one or more subband signal.

A fifth feature, combinable with any of the previous or following features, where the at least one of the one or more subband signals comprises a plurality of harmonic frequencies, and where determining that the at least one of the one or more subband signals is a high pitch signal includes: determining that a first harmonic frequency of the plurality of harmonic frequencies exceeds a first predetermined threshold and that a background spectrum level of the at least one of the one or more subband signals is below a second predetermined threshold.

A sixth feature, combinable with any of the previous or following feature, where performing the weighting on the residual signal of the at least one of the one or more subband signal includes: performing weighting on the residual signal of the at least one of the one or more subband signal by a low pass one pole filter.

A seventh feature, combinable with any of the previous features, where the method further includes: generating a quantized residual signal based at least on the weighted residual signal of the at least one of the one or more subband signal.

In a second implementation, an electronic device includes: a non-transitory memory storage comprising instructions, and one or more hardware processors in communication with the memory storage, wherein the one or more hardware processors execute the instructions to: receive an audio signal, the audio signal comprising one or more subband signals; generate a residual signal of at least one of the one or more subband signals based on the at least one of the one or more subband signals; determine that the at least one of the one or more subband signals is a high pitch signal; and in response to determining that the at least one of the one or more subband signals is a high pitch signal, perform weighting on the residual signal of the at least one of the one or more subband signal to generate a weighted residual signal.

The foregoing and other described implementations can each, optionally, include one or more of the following features:

A first feature, combinable with any of the following features, where the one or more subband signals include at least one of the following: a low low band (LLB) signal; a low high band (LHB) signal; a high low band (HLB) signal; or a high high band (HHB) signal.

A second feature, combinable with any of the previous or following features, where generating the residual signal of the at least one of the one or more subband signals based on the at least one of the one or more subband signals includes: performing inverse linear predictive coding (LPC) filtering on the at least one of the one or more subband signals to generate the residual signal of the at least one of the one or more subband signals.

A third feature, combinable with any of the previous or following features, where generating the weighted residual signal of the at least one of the one or more subband signals includes: generating a tilt-filtered signal of the at least one of the one or more subband signals based on the at least one of the one or more subband signals.

A fourth feature, combinable with any of the previous or following features, where determining that the at least one of the one or more subband signals is a high pitch signal includes: determining that the at least one of the one or more subband signals is a high pitch signal based on at least one of a current pitch gain, a smoothed pitch gain, a pitch lag length, or a spectral tilt of the at least one of the one or more subband signal.

A fifth feature, combinable with any of the previous or following features, where the at least one of the one or more subband signals comprises a plurality of harmonic frequencies, and where determining that the at least one of the one or more subband signals is a high pitch signal includes: determining that a first harmonic frequency of the plurality of harmonic frequencies exceeds a first predetermined threshold and that a background spectrum level of the at least one of the one or more subband signals is below a second predetermined threshold.

A sixth feature, combinable with any of the previous or following features, where performing the weighting on the residual signal of the at least one of the one or more subband signal includes: performing weighting on the residual signal of the at least one of the one or more subband signal by a low pass one pole filter.

A seventh feature, combinable with any of the previous features, where the one or more hardware processors further execute the instructions to: generate a quantized residual signal based at least on the weighted residual signal of the at least one of the one or more subband signal.

In a third implementation, a non-transitory computer-readable medium stores computer instructions for audio coding, that when executed by one or more hardware processors, cause the one or more hardware processors to perform operations including: receiving an audio signal, the audio signal comprising one or more subband signals; generating a residual signal of at least one of the one or more subband signals based on the at least one of the one or more subband signals; determining that the at least one of the one or more subband signals is a high pitch signal; and in response to determining that the at least one of the one or more subband signals is a high pitch signal, performing weighting on the residual signal of the at least one of the one or more subband signal to generate a weighted residual signal.

The foregoing and other described implementations can each, optionally, include one or more of the following features:

A first feature, combinable with any of the following features, where the one or more subband signals include at least one of the following: a low low band (LLB) signal; a low high band (LHB) signal; a high low band (HLB) signal; or a high high band (HHB) signal.

A second feature, combinable with any of the previous or following features, where generating the residual signal of the at least one of the one or more subband signals based on the at least one of the one or more subband signals includes: performing inverse linear predictive coding (LPC) filtering on the at least one of the one or more subband signals to generate the residual signal of the at least one of the one or more subband signals.

A third feature, combinable with any of the previous or following features, where generating the weighted residual signal of the at least one of the one or more subband signals includes: generating a tilt-filtered signal of the at least one of the one or more subband signals based on the at least one of the one or more subband signals.

A fourth feature, combinable with any of the previous or following features, where determining that the at least one of the one or more subband signals is a high pitch signal includes: determining that the at least one of the one or more subband signals is a high pitch signal based on at least one of a current pitch gain, a smoothed pitch gain, a pitch lag length, or a spectral tilt of the at least one of the one or more subband signal.

A fifth feature, combinable with any of the previous or following features, where the at least one of the one or more subband signals comprises a plurality of harmonic frequencies, and where determining that the at least one of the one or more subband signals is a high pitch signal includes: determining that a first harmonic frequency of the plurality of harmonic frequencies exceeds a first predetermined threshold and that a background spectrum level of the at least one of the one or more subband signals is below a second predetermined threshold.

A sixth feature, combinable with any of the previous or following feature, where performing the weighting on the residual signal of the at least one of the one or more subband signal includes: performing weighting on the residual signal of the at least one of the one or more subband signal by a low pass one pole filter.

A seventh feature, combinable with any of the previous features, where the operations further include: generating a quantized residual signal based at least on the weighted residual signal of the at least one of the one or more subband signal.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features, that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method for audio coding, the computer-implemented method comprising:

receiving, by at least one processor of an electronic device, an audio signal comprising one or more subband signals;

generating, by the at least one processor, a residual signal of at least one of the one or more subband signals based on the at least one of the one or more subband signals;

determining, by the at least one processor, that the at least one of the one or more subband signals is a high pitch signal, wherein the at least one of the one or more subband signals comprises a plurality of harmonic frequencies, and wherein determining that the at least one of the one or more subband signals is the high pitch signal comprises:

determining that a first harmonic frequency of the plurality of harmonic frequencies exceeds a first predetermined threshold and that a background spectrum level of the at least one of the one or more subband signals is below a second predetermined threshold;

in response to determining that the at least one of the one or more subband signals is the high pitch signal, performing, by the at least one processor, weighting on the residual signal of the at least one of the one or more subband signals using an adaptive weighting filter to generate a weighted residual signal, wherein the at least one of the one or more subband signals comprises a low low band signal, the adaptive weighting filter is conditionally activated for performing the weighting of the low low band signal in response to determining that the at least one of the one or more subband signals is the high pitch signal, and the weighted residual signal comprises a weighted low low band residual signal;

in response to determining an existence of a longer-term prediction (LTP) condition that is indicative of periodicity of the audio signal based at least in part on a determined pitch gain, generating a LTP contribution, and subtracting the LTP contribution from the weighted low low band residual signal to generate a second weighted low low band residual signal of the at least one of the one or more subband signals as an input for a low low band residual quantizer;

generating, by the low low band residual quantizer, a quantized low low band residual signal based at least on receipt of the second weighted residual signal of the at least one of the one or more subband signals; and transmitting the quantized low low band residual signal to a low low band decoder.

2. The computer-implemented method of claim 1, wherein the one or more subband signals further comprise at least one of the following:

a low high band (LHB) signal;

a high low band (HLB) signal; or a high high band (HHB) signal.

3. The computer-implemented method of claim 1, wherein generating the residual signal of the at least one of the one or more subband signals based on the at least one of the one or more subband signals comprises:

performing inverse linear predictive coding (LPC) filtering on the at least one of the one or more subband signals to generate the residual signal of the at least one of the one or more subband signals.

4. The computer-implemented method of claim 3, wherein generation of the weighted residual signal of the at least one of the one or more subband signals comprises:

generating a tilt-filtered signal of the at least one of the one or more subband signals based on the at least one of the one or more subband signals.

5. The computer-implemented method of claim 1, wherein determining that the at least one of the one or more subband signals is the high pitch signal comprises:

determining that the at least one of the one or more subband signals is the high pitch signal based on at least one of a current pitch gain, a smoothed pitch gain, a pitch lag length, or a spectral tilt of the at least one of the one or more subband signals.

6. The computer-implemented method of claim 1, wherein performing the weighting on the residual signal of the at least one of the one or more subband signals comprises:

performing weighting on the residual signal of the at least one of the one or more subband signals by a low pass one pole filter.

7. An electronic device, comprising:

a non-transitory memory storage having instructions stored thereon; and one or more hardware processors in communication with the memory storage, wherein the one or more hardware processors execute the instructions to:

receive an audio signal comprising one or more subband signals;

generate a residual signal of at least one of the one or more subband signals based on the at least one of the one or more subband signals;

determine that the at least one of the one or more subband signals is a high pitch signal, wherein the at least one of the one or more subband signals comprises a plurality of harmonic frequencies, and wherein the one or more hardware processors to execute the instructions to determine that the at least one of the one or more subband signals is the high pitch signal further comprises the one or more hardware processors to execute the instructions to:

determine that a first harmonic frequency of the plurality of harmonic frequencies exceeds a first predetermined threshold and that a background spectrum level of the at least one of the one or more subband signals is below a second predetermined threshold;

in response to determining that the at least one of the one or more subband signals is the high pitch signal, perform weighting on the residual signal of the at least one of the one or more subband signals using an adaptive weighting filter to generate a weighted residual signal, wherein the at least one of the one or more subband signals comprises a low low band signal, the adaptive weighting filter is conditionally activated for performing the weighting of the low low band signal in response to determining that the at least one of the one or more subband signals is the high pitch signal, and the weighted residual signal comprises a weighted low low band residual signal;

in response to determining an existence of a longer-term prediction (LTP) condition that is indicative of periodicity of the audio signal based at least in part on a determined pitch gain, generate a LTP contribution, and subtract the LTP contribution from the weighted low low band residual signal to generate a second weighted low low band residual signal of the at least one of the one or more subband signals as an input for a low low band residual quantizer;

generate, by the low low band residual quantizer, a quantized low low band residual signal based at least on receipt of the second weighted residual signal of the at least one of the one or more subband signals; and transmit the quantized low low band residual signal to a low low band decoder.

8. The electronic device of claim 7, wherein the one or more subband signals further comprise at least one of the following:

a low high band (LHB) signal;

a high low band (HLB) signal; or a high high band (HHB) signal.

9. The electronic device of claim 7, wherein the one or more hardware processors to execute the instructions to generate the residual signal of the at least one of the one or more subband signals based on the at least one of the one or more subband signals further comprises the one or more hardware processors to execute the instructions to:

perform inverse linear predictive coding (LPC) filtering on the at least one of the one or more subband signals to generate the residual signal of the at least one of the one or more subband signals.

10. The electronic device of claim 9, wherein the one or more hardware processors to execute the instructions to generate the weighted residual signal of the at least one of the one or more subband signals further comprises the one or more hardware processors to execute the instructions to:

generate a tilt-filtered signal of the at least one of the one or more subband signals based on the at least one of the one or more subband signals.

11. The electronic device of claim 7, wherein the one or more hardware processors to execute the instructions to determine that the at least one of the one or more subband signals is the high pitch signal further comprises the one or more hardware processors to execute the instructions to:

determine that the at least one of the one or more subband signals is the high pitch signal based on at least one of a current pitch gain, a smoothed pitch gain, a pitch lag length, or a spectral tilt of the at least one of the one or more subband signals.

12. The electronic device of claim 7, wherein the one or more hardware processors to execute the instructions to perform the weighting on the residual signal of the at least one of the one or more subband signals further comprises the one or more hardware processors to execute the instructions to:

perform weighting on the residual signal of the at least one of the one or more subband signals by a low pass one pole filter.

13. A non-transitory computer-readable medium storing computer instructions for audio coding, that when executed by one or more hardware processors, cause the one or more hardware processors to perform operations comprising:

receiving an audio signal comprising one or more subband signals;

generating a residual signal of at least one of the one or more sub band signals based on the at least one of the one or more subband signals;

determining that the at least one of the one or more subband signals is a high pitch signal, wherein the at least one of the one or more subband signals comprises a plurality of harmonic frequencies, and wherein determining that the at least one of the one or more subband signals is the high pitch signal comprises:

determining that a first harmonic frequency of the plurality of harmonic frequencies exceeds a first predetermined threshold and that a background spectrum level of the at least one of the one or more subband signals is below a second predetermined threshold;

in response to determining that the at least one of the one or more subband signals is the high pitch signal, performing weighting on the residual signal of the at least one of the one or more subband signals using an adaptive weighting filter to generate a weighted residual signal, wherein the at least one of the one or more subband signals comprises a low low band signal, the adaptive weighting filter is conditionally activated for performing the weighting of the low low band signal in response to determining that the at least one of the one or more subband signals is the high pitch signal, and the weighted residual signal comprises a weighted low low band residual signal;

in response to determining an existence of a longer-term prediction (LTP) condition that is indicative of periodicity of the audio signal based at least in part on a determined pitch gain, generating a LTP contribution, and subtracting the LTP contribution from the weighted low low band residual signal to generate a second weighted low low band residual signal of the at least one of the one or more subband signals as an input for a low low band residual quantizer;

generating, by the low low band residual quantizer, a quantized low low band residual signal based at least on receipt of the second weighted residual signal of the at least one of the one or more subband signals; and transmitting the quantized low low band residual signal to a low low band decoder.

14. The non-transitory computer-readable medium of claim 13, wherein the one or more subband signals further comprise at least one of the following:

a low high band (LHB) signal;

a high low band (HLB) signal; or a high high band (HHB) signal.

15. The non-transitory computer-readable medium of claim 13, wherein generating the residual signal of the at least one of the one or more subband signals based on the at least one of the one or more subband signals comprises:

performing inverse linear predictive coding (LPC) filtering on the at least one of the one or more subband signals to generate the residual signal of the at least one of the one or more subband signals.

16. The non-transitory computer-readable medium of claim 15, wherein generation of the weighted residual signal of the at least one of the one or more subband signals comprises:

generating a tilt-filtered signal of the at least one of the one or more subband signals based on the at least one of the one or more subband signals.

* * * * *